US008852295B2

(12) United States Patent
Hisamitsu et al.

(10) Patent No.: US 8,852,295 B2
(45) Date of Patent: Oct. 7, 2014

(54) SECONDARY BATTERY AND METHOD OF PRODUCING THE SECONDARY BATTERY

(71) Applicant: Nissan Motor Co., Ltd., Yokohama (JP)

(72) Inventors: Yasunari Hisamitsu, Yokohama (JP); Hideaki Horie, Yokosuka (JP); Taketo Kaneko, Yokohama (JP); Osamu Shimamura, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 13/891,755

(22) Filed: May 10, 2013

(65) Prior Publication Data

US 2013/0248106 A1    Sep. 26, 2013

Related U.S. Application Data

(62) Division of application No. 12/133,733, filed on Jun. 5, 2008, now Pat. No. 8,450,011.

(30) Foreign Application Priority Data

Jun. 6, 2007   (JP) ................................ 2007-150802
Feb. 13, 2008  (JP) ................................ 2008-031801

(51) Int. Cl.
| H01M 10/04   | (2006.01) |
| H01M 4/64    | (2006.01) |
| H01M 2/16    | (2006.01) |
| H01M 10/0565 | (2010.01) |
| H01M 10/0585 | (2010.01) |
| H01M 10/0566 | (2010.01) |
| H01M 10/052  | (2010.01) |
| H01M 4/13    | (2010.01) |
| H01M 10/056  | (2010.01) |
| H01M 4/70    | (2006.01) |
| H01M 4/133   | (2010.01) |
| H01M 4/131   | (2010.01) |
| H01M 10/0525 | (2010.01) |

(52) U.S. Cl.
CPC ....... *H01M 10/04* (2013.01); *H01M 2300/0082* (2013.01); *H01M 10/0565* (2013.01); *H01M 4/133* (2013.01); *Y02E 60/122* (2013.01); *H01M 4/131* (2013.01); *H01M 10/0418* (2013.01); *H01M 10/0585* (2013.01); *H01M 10/0566* (2013.01); *H01M 10/052* (2013.01); *H01M 2300/0025* (2013.01); *H01M 4/13* (2013.01); *H01M 10/0525* (2013.01); *H01M 10/056* (2013.01); *H01M 4/70* (2013.01)
USPC .......... 29/623.5; 429/188; 429/249; 429/233; 429/306; 429/324; 156/280

(58) Field of Classification Search
USPC ......... 429/209, 122, 154, 144, 251, 252, 242, 429/246, 188, 249, 233, 306, 324; 29/623.1, 623.5; 361/502, 525; 156/280
See application file for complete search history.

(56) References Cited

U.S. PATENT DOCUMENTS 3,141,795 A * 7/1964 Eisler ............................ 429/154
5,223,353 A * 6/1993 Ohsawa et al. ............... 429/307
(Continued)

FOREIGN PATENT DOCUMENTS

CN    1285959 A     2/2001
EP    0 967 672 A1  12/1999
(Continued)

OTHER PUBLICATIONS

Gifford, P.R., "Batteries, Other Secondary Cells", Kirk-Othmer Encyclopedia of Chemical Technology, Ovonic Battery Company, Dec. 4, 2000.

*Primary Examiner* — Kenneth Douyette
(74) *Attorney, Agent, or Firm* — Foley & Lardner LLP

(57) ABSTRACT

A secondary battery includes: an electric cell layer including a stack structure sequentially including: a positive electrode layer, a separator layer, and a negative electrode layer having an electrolyte higher in conductivity than an electrolyte of at least one of the separator layer and the positive electrode layer.

6 Claims, 5 Drawing Sheets

(56) References Cited

U.S. PATENT DOCUMENTS

| | | | |
|---|---|---|---|
| 5,418,091 A | 5/1995 | Gozdz et al. | |
| 5,748,439 A * | 5/1998 | MacFarlane et al. | 361/525 |
| 6,001,139 A | 12/1999 | Asanuma et al. | |
| 6,051,340 A | 4/2000 | Kawakami et al. | |
| 6,096,456 A * | 8/2000 | Takeuchi et al. | 429/249 |
| 6,207,318 B1 | 3/2001 | Wessel et al. | |
| 7,183,021 B1 | 2/2007 | Akashi et al. | |
| 7,381,500 B2 | 6/2008 | Oh et al. | |
| 2002/0165291 A1* | 11/2002 | Choi | 522/114 |
| 2004/0053122 A1* | 3/2004 | Sugiyama et al. | 429/144 |
| 2004/0053123 A1 | 3/2004 | Chang et al. | |
| 2005/0069767 A1 | 3/2005 | Tsunekawa et al. | |
| 2005/0277019 A1 | 12/2005 | Riley et al. | |
| 2006/0105244 A1 | 5/2006 | Kejha et al. | |
| 2007/0122716 A1* | 5/2007 | Seo et al. | 429/251 |

FOREIGN PATENT DOCUMENTS

| | | |
|---|---|---|
| JP | 09-320569 A | 12/1997 |
| JP | 2001-043897 A | 2/2001 |
| JP | 2001-222988 A | 8/2001 |
| JP | 2002-025619 A | 1/2002 |
| JP | 2002-158038 A | 5/2002 |
| JP | 2005-267955 A | 9/2005 |
| KR | 200348261 A | 6/2003 |
| KR | 440930 B1 | 7/2004 |
| WO | WO-2006/064344 A2 | 6/2006 |

\* cited by examiner

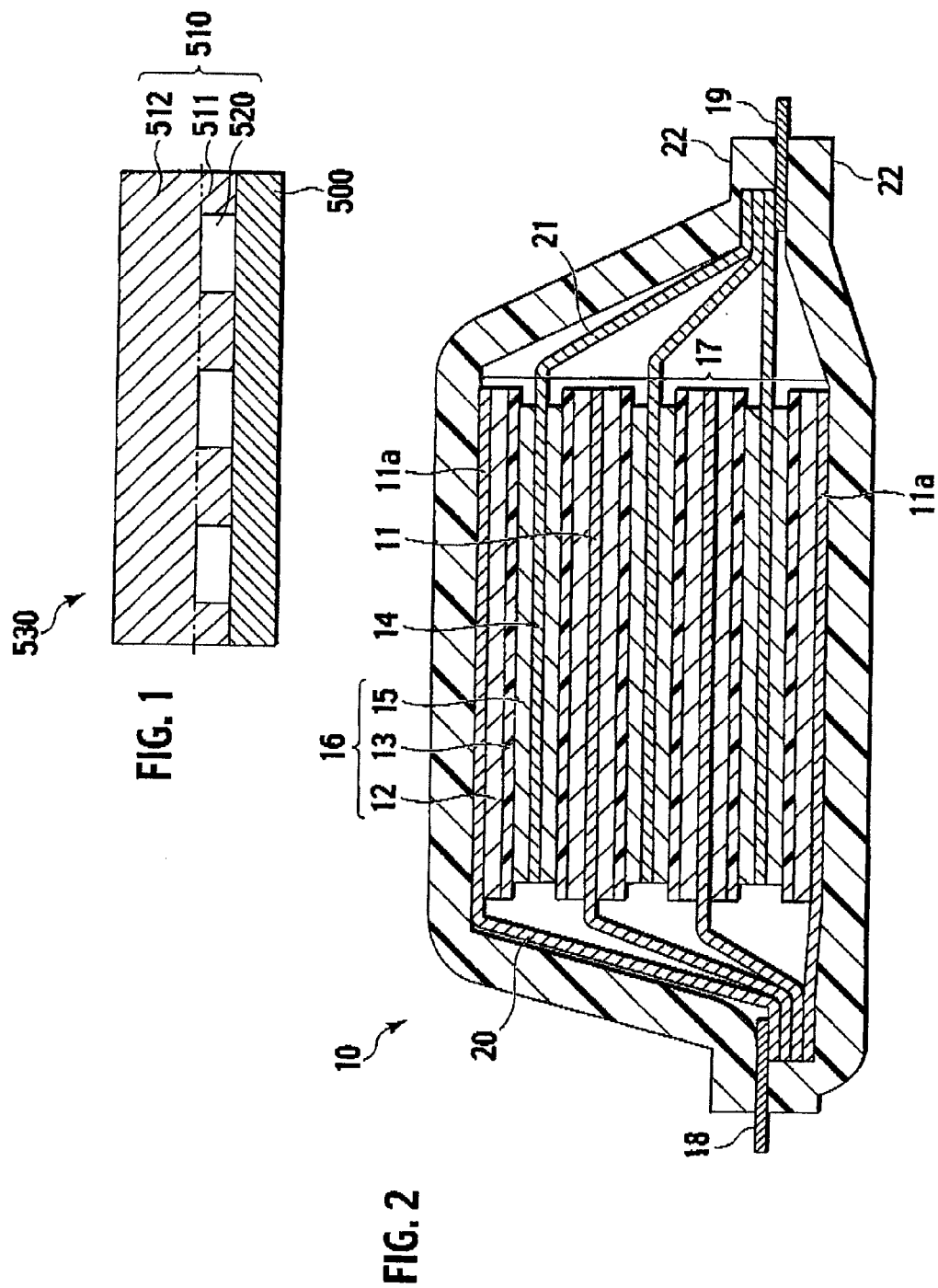

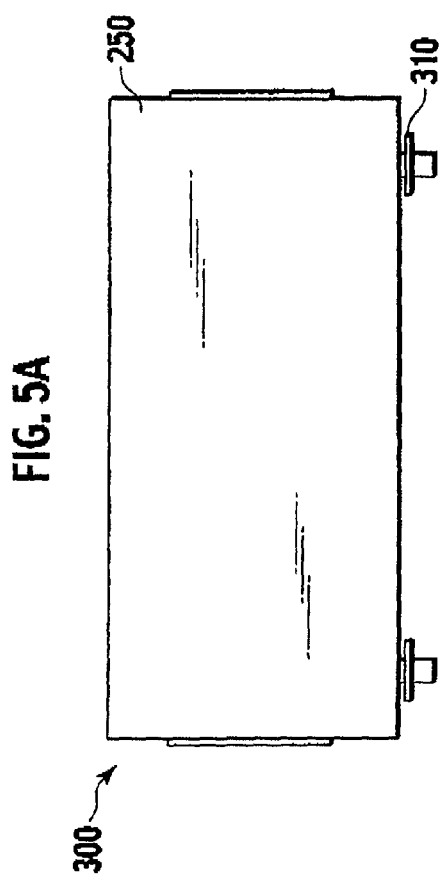
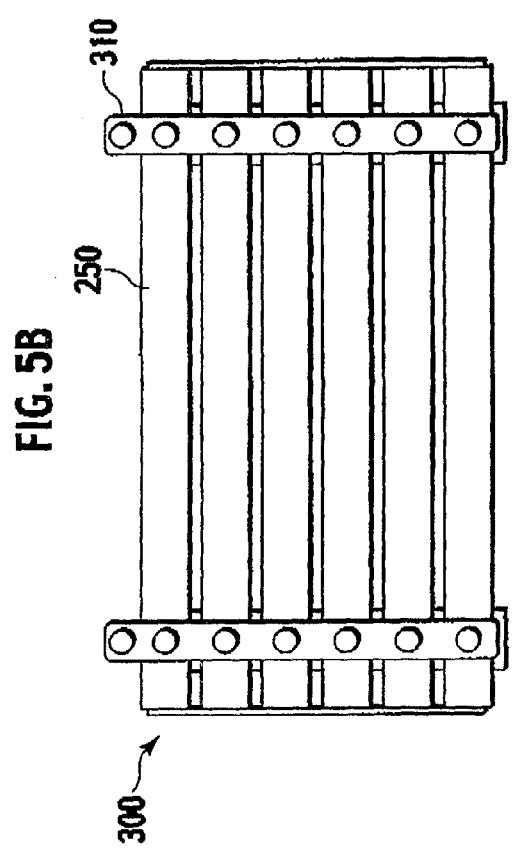
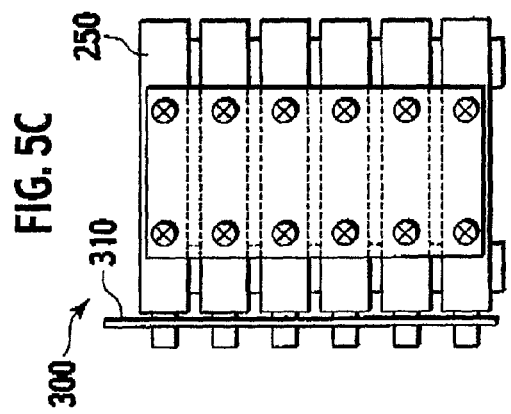

SECONDARY BATTERY AND METHOD OF PRODUCING THE SECONDARY BATTERY

CROSS-REFERENCE TO RELATED APPLICATIONS

This application is a divisional of Ser. No. 12/133,733 filed on Jun. 5, 2008, now U.S. Pat. No. 8,450,011, which claims the benefit of priority from Japanese Patent Application No. 2007-150802 filed on Jun. 6, 2007 and Japanese Patent Application No. 2008-031801 filed on Feb. 13, 2008, the entire contents of all are incorporated herein by reference.

BACKGROUND OF THE INVENTION

1. Field of the Invention

The present invention relates to a secondary battery and a method of producing the secondary battery, where the secondary battery is capable of bringing about high capacity and high output.

2. Description of the Related Art

A secondary battery, especially a lithium ion secondary battery ordinarily includes a positive electrode (positive electrode layer), a liquid or a solid electrolytic layer (separator layer) and a negative electrode (negative electrode layer). In this case, a positive electrode active material and a negative electrode active material are mixed with a conductive assistance, a binder and the like and then are applied to a current collector, to thereby form the positive electrode and the negative electrode respectively.

The above lithium ion secondary battery is in need of higher energy density and higher output in the trend of development, with a strategy for thinning the secondary battery. For accomplishing the above thin secondary battery having a light weight, one solution is a polymer battery which is thinned by using an electrolytic part made of solid. Hereinabove, the electrolytic part was so far made of solution.

The above technology is already known in the art. However, performance (characteristic) of the recent secondary battery has been incomparably improved much more than when the above technology was first disclosed.

A polymer battery uses such a technology that a solid polyvinylidene fluoride (PVDF) electrolytic medium is prepared, then the thus prepared is joined with a positive electrode and a negative electrode, then a plasticizer is extracted from an entire cell prime field, then an electrolytic solution is injected, to thereby gelate the entire cell prime field. The above gelation of the entire cell prime field can eliminate a free electrolytic solution from inside the cell. However, using the solid gelling electrolyte causes an insufficient mechanical strength and fails to accomplish a homogenous application of the thin film electrolyte, resulting in lack of practicability.

For solving the above inconveniences, U.S. Pat. No. 7,183,021 B1 {family of Japanese Patent Application Laid-Open No. 2001-43897 (JP2001043897)} discloses a method of using a solid electrolyte in combination with a separator.

SUMMARY OF THE INVENTION

In view of the above, it is an object of the present invention to provide a high-capacity and high-output secondary battery and a method of producing the secondary battery, where the secondary battery accomplishes an easy charging and discharging at a great current.

According to a first aspect of the present invention there is provided a secondary battery comprising: an electric cell layer including a stack structure sequentially including: a positive electrode layer, a separator layer, and a negative electrode layer having an electrolyte higher in conductivity than an electrolyte of at least one of the separator layer and the positive electrode layer.

According to a second aspect of the present invention, there is provided a method of producing a secondary battery, the method comprising the following sequential operations: adhering the separator layer to each of the positive electrode layer and the negative electrode layer, to thereby form a stack structure of the positive electrode layer, the separator layer and the negative electrode layer; and injecting a liquid electrolyte to the stack structure.

According to a third aspect of the present invention, there is provided a method of producing a secondary battery, the method comprising the following sequential operations: adhering the separator layer to each of the positive electrode layer and the negative electrode layer, to thereby form a stack structure of the positive electrode layer, the separator layer and the negative electrode layer; injecting a liquid electrolyte to the stack structure; and vacuum-impregnating the stack structure.

Other objects and features of the present invention will become understood from the following description with reference to the accompanying drawings.

BRIEF DESCRIPTION OF THE DRAWINGS

FIG. 1 shows a schematic of an electrode layer, according to first to fifth embodiments of the present invention.

FIG. 2 shows a typical lithium ion secondary battery, that is, a schematic of a cross sectional view of an entire structure of a flat stack non-bipolar lithium ion secondary battery, according to the first embodiment of the present invention.

FIG. 5A, FIG. 5B and FIG. 5C show a typical pack battery, according to the fourth embodiment of the present invention, where FIG. 5A is a plan view of the pack battery, FIG. 5B is a front view of the pack battery and FIG. 5C is a side view of the pack battery.

DESCRIPTION OF THE PREFERRED EMBODIMENTS

Figure 3:
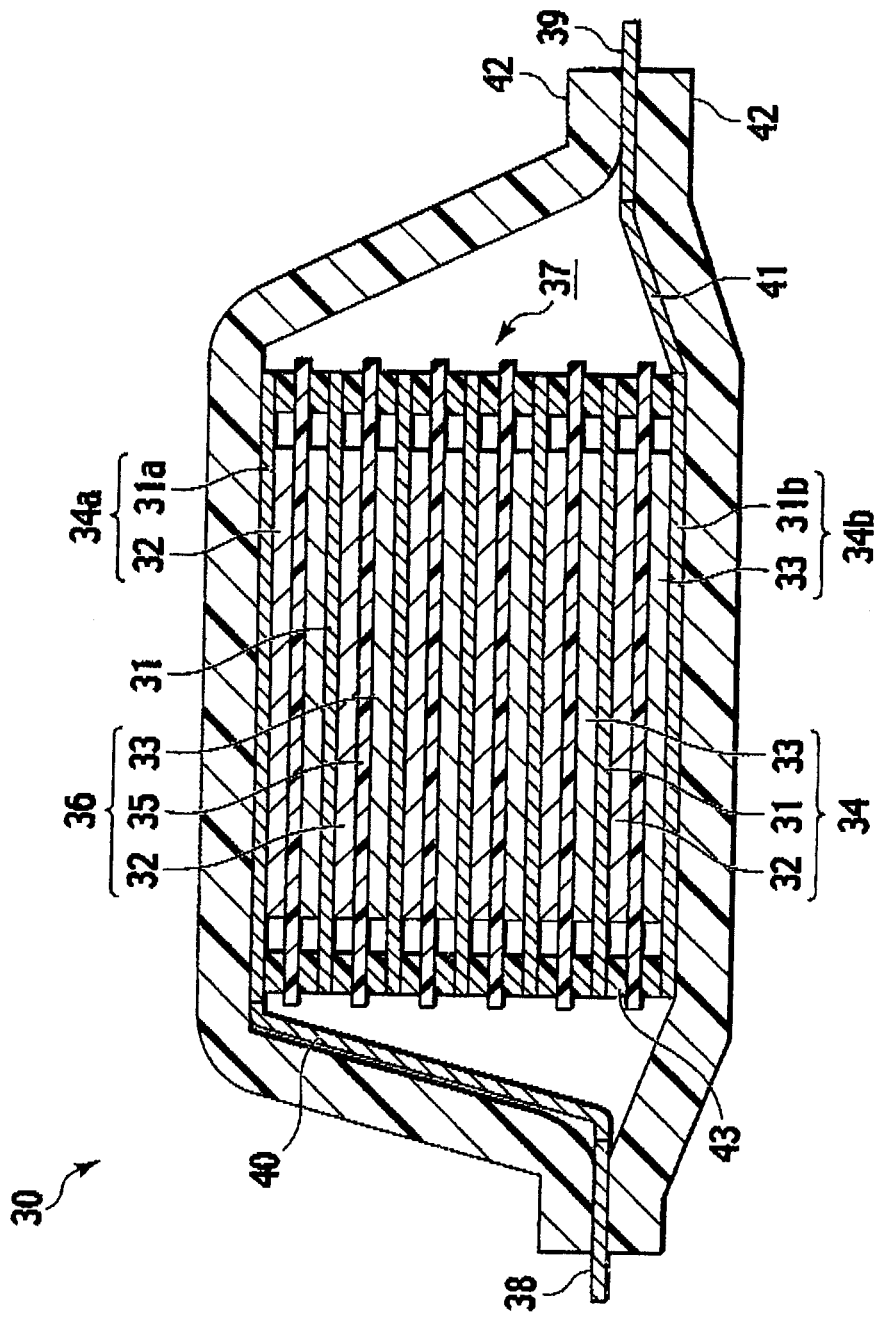
FIG. 3 shows a typical lithium ion secondary battery, that is, a schematic of a cross sectional view of an entire structure of a flat stack bipolar lithium ion secondary battery, according to the second embodiment of the present invention.

The present invention relates to a secondary battery comprising: an electric cell layer including a stack structure sequentially including: a positive electrode layer, a separator layer, and a negative electrode layer having an electrolyte higher in conductivity than an electrolyte of at least one of the separator layer and the positive electrode layer.

Conventionally, a separator layer uses any of the following electrolytes: 1) a liquid electrolyte having such a structure that a lithium salt (lithia water) as a supporting electrolyte is dissolved in an organic solvent as a plasticizer, and 2) a gel electrolyte having such a structure that a liquid electrolyte is injected in a matrix polymer including ion conductive polymer. In the former case (liquid electrolyte), using the secondary battery for a long time deposits a lithium during charging cycle of the secondary battery, causing an internal short circuit of the secondary battery. As such, it is preferable to use the gel electrolyte for the separator layer. However, the conventional separator, as the case may be, did not have a sufficient mechanical strength, and using a solid electrolyte for all of the positive electrode layer, separator layer and negative electrode layer leads to an increased resistance which may be caused by diffusion of the polymer electrolyte. Especially, using a carbon material as a negative electrode active material, as the case may be, makes it difficult to implement charging and discharging at a great current, due to a great interfacial resistance between the active material and the polymer electrolyte.

Contrary to the above, according to the present invention, using a high conductivity electrolyte as a negative electrode layer having a lower reactivity and a greater resistance than those of a positive electrode layer can improve electrolyte transportability in the negative electrode layer. Especially, when the polymer electrolyte is used for the separator layer, the separator layer can be integrated with an electrolyte layer, thus thinning the separator layer. Moreover, using the polymer electrolyte for the separator layer can prevent conventional inconveniences caused in the charging cycle, namely, such inconveniences as the above lithium deposition and the internal short circuit of secondary battery.

As such, the secondary battery of the present invention can bring about high capacity and high output due to the following features: i) the separator layer is thinned, ii) the electrolyte transportability in the negative electrode layer is high, and iii) the interfacial reactivity of the negative electrode layer is high. The above states i), ii) and iii) can be kept. Especially, a liquid material (hereinafter otherwise referred to as "liquid electrolyte") used for the electrolyte of the negative electrode layer can more effectively bring about the above advantages.

At least one electric cell layer included in the secondary battery of the present invention has such a structure that the electrodes (i.e., positive electrode and negative electrode) as a positive electrode layer and a negative electrode layer are opposed to each other and a separator is interposed between the positive electrode layer and the negative electrode layer. In the above structure, at least one of the separator layer and the positive electrode layer, especially the separator layer has an electrolyte having a conductivity lower than that of an electrolyte of the negative electrode layer. Especially, a solid electrolyte is interpenetrated (held) in the separator layer. With the electrolyte interpenetrated (held) in the separator layer which is a part of a stack structure; even when the electrolyte has a contact with the electrolytic solution in the negative electrode layer, the following inconveniences can be suppressed or prevented: 1) solid electrolyte outflow attributable to swelling or expansion, and 2) exfoliation of interface between the electrode and the separator layer, which exfoliation is attributable to the solid electrolyte outflow. Moreover, the separator layer having a contact with each of the negative electrode layer and the positive electrode layer can further prevent the above conventional inconveniencies. As such, according to the present invention, a liquid material having a high reactivity and an excellent ion conductivity can be used as an electrolyte of the positive electrode layer or negative electrode layer, especially, the negative electrode layer having a lower reactivity and a greater resistance than those of the positive electrode layer. Especially, using the polymer electrolyte for the separator layer thins the separator layer and allows the secondary battery to bring about a still higher output.

In the following, various embodiments of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrated.

Under the present invention, a secondary battery comprises: an electric cell layer including a stack structure sequentially including: a positive electrode layer, a separator layer, and a negative electrode layer having an electrolyte higher in conductivity than an electrolyte of at least one of the separator layer and the positive electrode layer. In the above structure, it is preferable that the conductivity of the electrolyte of the negative electrode layer is higher than the conductivity of the electrolyte of the separator layer, thereby effectively preventing the above inconvenience which is caused by using a polymer electrolyte for the separator layer.

In the specification, the conductivity of the electrolyte is defined by the value calculated through the following method specified under JIS KO102 where JIS stands for Japanese Industrial Standards. Specifically, a cell constant ($cm^{-1}$) is calculated by dividing a length (cm) (an interval between opposing two metal plates used for measurement) by the metal plate's area ($cm^2$).

Cell constant($cm^{-1}$)=Length/Area [Expression 1]

Moreover, the thus calculated cell constant ($cm^{-1}$) and a resistance ($\Omega$) which is measured otherwise are used for calculating the electrolyte conductivity (S/cm).

Electrolyte conductivity=Cell constant/Resistance [Expression 2]

More specifically, for measuring conductivity of polymer electrolyte, the following operations are taken. A polymer precursor solution is applied to a first parting film. Then, the polymer precursor solution is sandwiched by the first parting film and a second parting film, Then, the thus obtained is further sandwiched by transparent glass plates, followed by a photo polymerizing, to thereby prepare a polymer film having a proper thickness. The polymer film is then sandwiched by two metal plates each fitted with a lead wire and having a certain area. In this state, the polymer film is subjected to measurement of its thickness, which is defined as the length (cm). The length (cm) divided by the metal plate's area ($cm^2$) obtains the cell constant ($cm^{-1}$). In addition, the lead wire is connected to an impedance meter for measuring the resistance ($\Omega$). The cell constant ($cm^{-1}$) divided by the resistance ($\Omega$) obtains the electrolyte conductivity (S/cm).

Under the present invention, it is preferable that at least one of the separator layer and the positive electrode layer, especially the separator layer, has a conductivity which is $1/100$ to $1/2$ relative to a conductivity of an electrolyte of the negative electrode layer. The above conductivity ratio less than or equal to $1/2$ can keep a battery's possible internal short circuit small, thereby keeping the battery functional. Meanwhile, the above conductivity ratio more than or equal to $1/100$ is a proper conductivity, accomplishing a sufficient performance of an entire secondary battery to be obtained.

More preferably, at least one of the separator layer and the positive electrode layer has a conductivity which is $1/50$ to $1/2$ relative to the conductivity of the electrolyte of the negative electrode layer. Still more preferably, the above conductivity ratio is $1/20$ to $1/2$. The above ranges of conductivity ratio do not cause the short circuit to the battery, accomplishing a sufficient performance of the entire secondary battery to be obtained.

Under the present invention, it is preferable that the electrolyte of the negative electrode layer is made of liquid material and that the electrolyte of at least one of the separator layer and the positive electrode layer is made of polymer. In other words, at least one of the following three structures in respective paragraphs (1), (2) and (3) is preferred:

(1) The electrolyte of each of the negative electrode layer and the positive electrode layer is made of liquid material while the electrolyte of the separator layer is made of polymer.
(2) The electrolyte of each of the negative electrode layer and the separator layer is made of liquid material while the electrolyte of the positive electrode layer is made of polymer, and
(3) The electrolyte of the negative electrode layer is made of liquid material while the electrolyte of each of the separator layer and the positive electrode layer is made of polymer.

The above paragraphs (1) and (3) are especially preferable. Relative to the positive electrode layer, the negative electrode layer is low in reactivity and large in resistance. Therefore, a liquid material having a high reactivity and an excellent ion conductivity is preferable for the electrolyte of the negative electrode layer. In the case of paragraph (1) above, i) the separator layer has a thin film, ii) the electrolyte transportability in the negative electrode layer is high and iii) the interfacial reactivity of the negative electrode is high. The above states i), ii) and iii) can be kept, to thereby obtain a battery bringing about high capacity and high output. In the case of paragraph (3) above, the electrolyte of the positive electrode layer is made of polymer, thereby effectively suppressing or preventing deterioration which may be caused by an elution of the positive electrode. In the case of the separator layer made of polymer electrolyte, the separator layer can be thin. Moreover, the liquid material for the electrolyte of the negative electrode layer can bring about a high electrolyte transportability in the negative electrode layer and keep the interfacial reactivity of the negative electrode in a high state. As such, the thus obtained secondary battery can bring about high capacity and high output.

<Liquid Material>

Under the present invention, the liquid material is not specifically limited and is typically prepared by dissolving a supporting electrolyte in a non-aqueous solvent. Herein, the non-aqueous solvent is not specifically limited, examples thereof including those known in the art (plasticizer such as nonprotic solvent and the like). Examples of the non-aqueous solvent include: cyclic carbonates such as propylene carbonate and ethylene carbonate; chain carbonates such as dimethyl carbonate, methylethyl carbonate and diethyl carbonate; ethers such as tetrahydrofuran, 2-methyl tetrahydrofuran, 1,4-dioxane, 1,2-dimethoxy ethane, 1,2-dibutoxy ethane, 1,3-dioxolane and diethylether; lactones such as γ-butyrolactone; nitriles such as acetonitrile; esters such as methyl propionate; amides such as dimethyl formamide; esters such as methyl acetate and methyl formate; sulfolane; dimethyl sulfoxide; 3-methyl-1,3-oxazolidine-2-on; and the like. The above non-aqueous solvents may be used alone or in combination of two or more types thereof. A mixture ratio in the case of combination is not specifically limited as long as the above mixture ratio is capable of dissolving the supporting electrolyte, and the mixture ratio may be properly selected according to type of the non-aqueous solvent or according to a desired characteristic.

<Supporting Electrolyte>

Moreover, the supporting electrolyte is not specifically limited and those known (lithium salt=lithia water) may be used. Examples of the supporting electrolyte include: inorganic acid anion salts such as $LiPF_6$, $LiBF_4$, $LiClO_4$, $LiAsF_6$, $LiTaF_6$, $LiAlCl_4$, $Li_2B_{10}Cl_{10}$ and the like; organic acid anion salts such as $LiCF_3SO_3$, $Li(CF_3SO_2)_2N$, $Li(C_2F_5SO_2)_2N$ and the like; and the like. Among the above, $LiPF_6$ is preferably used. The above supporting electrolytes may be used alone or in combination of two or more types thereof.

<Polymer Electrolyte>

Under the present invention, the polymer electrolyte is not specifically limited, examples thereof including a gel polymer electrolyte and an intrinsic (entirely solid) polymer electrolyte. Herein, the gel polymer electrolyte is not specifically limited, examples thereof including: an ion conductive solid polymer electrolyte containing an electrolytic solution used for a conventional lithium ion secondary battery, and a polymer free of lithium ion conductivity and having a skeleton which is allowed to hold an electrolytic solution used for a conventional lithium ion secondary battery. Examples of the ion conductive solid polymer electrolyte include a matrix polymer including ion conductive polymer, where the matrix polymer is a known solid polymer electrolyte and the like, such as polyethylene oxide (PEO), polypropylene oxide (PPO) and a copolymer of these. The above polyalkylene oxide polymer, which is capable of dissolving therein electrolytic salt such as lithium salt (lithia water), is preferable. Moreover, examples of the polymer free of lithium ion conductivity include polyvinylidene fluoride (PVDF), polyvinyl chloride (PVC), polyacrylonitrile (PAN), polymethyl methacrylate (PMMA) and the like, but not limited thereto. Hereinabove, PAN, PMMA and the like rather belong to a category having an ion conductivity which is small but do present. Therefore, PAN, PMMA and the like can be so categorized as to belong to the ion conductive polymer. At least herein, however, PAN, PMMA and the like are exemplified as the polymer used for the gel polymer electrolyte and free of lithium ion conductivity <Gel Polymer Electrolyte>

The electrolytic solution included in the gel polymer electrolyte is not specifically limited and is typically prepared by dissolving the supporting electrolyte in the non-aqueous solvent, like the liquid material is prepared as set forth above. In other words, the non-aqueous solvent is not specifically limited and therefore those (plasticizer such as nonprotic solvent and the like) set forth above can be used. The above non-aqueous solvents may be used alone or in combination of two or more types thereof. A mixture ratio in the case of combination is not specifically limited as long as the above mixture ratio is capable of dissolving the supporting electrolyte, and the mixture ratio may be properly selected according to type of the non-aqueous solvent or a desired characteristic. For example, when ethylene carbonate (EC) is combined with diethyl carbonate (DEC), EC's volume relative to a total volume of EC and DEC is preferably 10 volume % to 80 volume %, and more preferably 20 volume % to 60 volume %. Moreover, the supporting electrolyte is not specifically limited and those (lithium salt=lithia water) set forth above may be used. The above supporting electrolytes may be used alone or in combination of two or more types thereof. Moreover, amount of the supporting electrolyte added to the non-aqueous solvent is not specifically limited and therefore the above amount may be the one conventionally used. A mole ratio (concentration) of the supporting electrolyte in the non-aqueous solvent is preferably 0.5 $mol/dm^3$ to 2 $mol/dm^3$. The above range of mole ratio can bring about a sufficient reactivity (ion conductivity).

<Intrinsic (Entirely Solid) Polymer Electrolyte>

Moreover, the intrinsic (entirely solid) polymer electrolyte has such a structure that the supporting electrolyte (lithium salt=lithia water) is dissolved in the above matrix polymer and the intrinsic (entirely solid) polymer electrolyte does not include an organic solvent (non-aqueous solvent) serving as the above plasticizer. Therefore, the intrinsic polymer does not cause a liquid leak from the battery, thus improving reliability of the battery. In addition, an intrinsic polymer battery uses a solid polymer electrolyte having ion conductivity. Examples of the matrix polymer include a known solid polymer electrolyte such as polyethylene oxide (PEO), polypropylene oxide (PPO) and a copolymer thereof.

Moreover, under the present invention, the above gel polymer electrolyte and the intrinsic (entirely solid) polymer electrolyte each may be used alone or in combination of two or more types thereof. Otherwise, one or more types of the gel polymer electrolyte(s) may be combined with one or more types of the intrinsic (entirely solid) polymer electrolyte(s). Moreover, in the case of the single electric cell layer having the separator layer and the positive electrode layer each including polymer electrolyte as set forth in the above paragraph (3), such polymer electrolytes may be same or different. For ease of production, however, the same polymer electrolytes are preferable. Likewise, in the case of a secondary battery including two or more electric cells, the electrolytes of the separator layers in the electric cells may be same or different while the electrolytes of the positive electrode layers in the electric cells may be same or different. For ease of production, however, the same polymer electrolytes are preferable.

Under the present invention, it is preferable that at least the positive electrode layer and the separator layer have a contact with each other. The contact between the positive electrode layer and the separator layer can prevent a possible polymer outflow which may be caused when the polymer in a range from the surface to inner part of the separator is swelled due to an electrolytic solution oozed (exudated) out of the negative electrode layer. It is more preferable that the separator layer has a contact with each of the positive electrode layer and the negative electrode layer. The above contacts can more effectively prevent a possible polymer outflow which may be caused when the polymer in a range from the surface to inner part of the separator is swelled due to an electrolytic solution oozed (exudated) out of the negative electrode layer or positive electrode layer.

In this specification, the language "the positive electrode layer having a contact with the separator layer" signifies a state which is free of electrolyte outflow even when a liquid material in the negative electrode layer is exudated (oozed) out, where the electrolyte outflow may be caused by a swelling of the electrolyte (especially, polymer electrolyte) in a range from the surface to inner part of the separator. Meanwhile, the language "the separator layer having a contact with each of the positive electrode layer and the negative electrode layer" signifies a like state. Specifically, in the case of "the positive electrode layer having a contact with the separator layer," the contact state between the positive electrode layer and the separator layer includes the followings: 1) a first state where a stack structure of the positive electrode layer and separator layer is pressed (pressure welding) in a direction of thickness of the stack structure with a pressure, and 2) a second state where the positive electrode layer is adhered to the separator layer by polymerizing the followings in the presence of a polymerizing initiator: i) an adhesive, and ii) an electrolyte in the separator layer. Of the above first and second states, it is preferable to adhere the positive electrode layer to the separator layer. It is more preferable to adhere the separator layer to each of the positive electrode layer and the negative electrode layer.

<Groove of Positive Electrode Layer or Negative Electrode Layer>

Under the present invention, in the case of the electrode layer (positive electrode layer and negative electrode layer) including a current collector, and an active material layer formed on the current collector, it is preferable that at least one of the positive electrode active material layer and the negative electrode active material layer is so configured to have a groove, preferably, on a side contacting the current collector.

For impregnating the electrolyte in the production of the electrode layer, the above grooved structure can improve electrolytic permeability (of an after-described polymer electrolytic precursor and an after-descried liquid electrolyte) to the electrode layer's central part into which the liquid is unlikely to permeate. The polymer electrolytic precursor has an electrolyte which is less permeable than the liquid electrolyte. Therefore, it is preferable that the groove is formed at least in the electrode layer for impregnating the polymer electrolytic precursor. The active material layer and the current collector are to be set forth afterward.

<Shape and Size of Groove of Positive Electrode Layer or Negative Electrode Layer>

The shape and size of the groove of the positive electrode layer or negative electrode layer are not specifically limited. The groove may have an arbitrary cross section as long as the electrolytic solution can interpenetrate in the groove, examples of the groove shape including square, rectangle, quadrangle, equilateral triangle, isosceles triangle, triangle, semicircle, semiellipse and the like. The groove may have an arbitrary size as long as the electrolytic solution is likely to interpenetrate in the positive electrode layer or negative electrode layer. Preferably, the groove has a width 100% to 5000% of an average particle diameter of the positive electrode active material (for positive electrode layer) or negative electrode active material (for negative electrode layer). Moreover, the groove has a volume of 5% to 30% of a volume of the positive electrode layer or negative electrode layer, where the above percentage is calculated by the following equation: (Total volume of groove/Volume of electrode layer)×100(%). The groove having the above shape and size allows the electrolyte (liquid electrolyte, polymer electrolytic precursor and the like) to sufficiently permeate in the electrode layer's central part into which the liquid is unlikely to permeate.

<Direction of Groove>

Moreover, the direction for forming the groove is not specifically limited as long as the electrolyte can conveniently permeate in the positive electrode layer or negative electrode layer. Examples of the groove direction include i) longitudinal and lateral in a form of a grid, ii) parallel in a constant direction, iii) honeycomb (hexagonal), and the like. Of the above, parallel in a constant direction, especially, the direction for injecting the electrolytic solution is preferable, so that the electrolytic solution can be smoothly injected into the groove.

<Method of Forming Groove of Positive Electrode Layer or Negative Electrode Layer>

The method for forming the groove of positive electrode layer or negative electrode layer is not specifically limited, examples thereof including the following: 1) to a surface of the current collector, patterning (as a first sublayer) a slurry including an active material, so as to form a groove, and 2) transcribing a second sublayer on the first sublayer, so as to form the second sublayer. The above patterning may be those known in the art, examples thereof including spray coat, screen print, ink jet and the like. FIG. 1 shows a schematic of an electrode layer. In FIG. 1, an electrode layer 530 includes a current collector 500, and an active material layer 510 on the current collector 500. Patterning can form a first active material sublayer 511. In this case, the patterning is so implemented that a groove 520 is formed after a second active material sublayer 512 is applied. Then, the second active material sublayer 512 substantially equivalent to an entire area of the collect collector 500 is transcribed on the first active material sublayer 511, thereby forming the electrolyte layer 530 having the groove 520.

<Method of Producing Secondary Battery>

The method for producing the secondary battery of the present invention is not specifically limited, examples of the production method including those known in the art or a properly modified version thereof. Hereinafter described is a method of producing an electric cell layer having such a structure that i) the electrolyte of each of the positive electrode layer and the negative electrode layer is liquid, ii) the electrolyte of the separator is polymer, and iii) the separator layer has a contact with each of the positive electrode layer and the negative electrode layer. Note that the method for adhering the positive electrode layer to the separator layer is to be omitted, since this method only excludes the negative electrode layer.

Specifically, the method for producing the secondary battery includes the following operations.

Operation (1) Dissolving a supporting electrolyte in a non-aqueous solvent, to thereby prepare an electrolytic solution.

Operation (2) adding the above-described matrix polymer, supporting electrolyte and polymerizing initiator to the thus prepared electrolytic solution, to thereby prepare an electrolytic precursor solution.

Operation (3) Dipping a separator substrate in the above electrolytic precursor solution, followed by removing of an excessive electrolytic precursor solution, to thereby prepare an impregnated separator.

Operation (4) Sandwiching the thus impregnated separator between a positive electrode layer and a negative electrode layer, followed by polymerizing of the electrolyte of the impregnated separator, to thereby adhere the separator layer to each of the positive electrode layer and the negative electrode layer.

<Operation (1)>

In the operation (1), the non-aqueous solvent is not specifically limited and therefore those known in the art (plasticizer such as nonprotic solvent and the like) are available. Examples of the non-aqueous solvent include: cyclic carbonates such as propylene carbonate and ethylene carbonate; chain carbonates such as dimethyl carbonate, methylethyl carbonate and diethyl carbonate; ethers such as tetrahydrofuran, 2-methyl tetrahydrofuran, 1,4-dioxane, 1,2-dimethoxy ethane, 1,2-dibutoxy ethane, 1,3-dioxolane and diethylether; lactones such as γ-butyrolactone; nitriles such as acetonitrile; esters such as methyl propionate; amides such as dimethyl formamide; esters such as methyl acetate and methyl formate; sulfolane; dimethyl sulfoxide; 3-methyl-1,3-oxazolidine-2-on; and the like. The above non-aqueous solvents may be used alone or in combination of two or more types thereof. A mixture ratio in the case of combination is not specifically limited as long as such the above mixture ratio is capable of dissolving the supporting electrolyte, and the mixture ratio may be properly selected according to type of the non-aqueous solvent or according to a desired characteristic. For example, when ethylene carbonate (EC) is combined with diethyl carbonate (DEC), EC's volume relative to a total volume of the EC and DEC is preferably 10 volume % to 80 volume %, and more preferably 20 volume % to 60 volume %.

In the operation (1), the supporting electrolyte is not specifically limited and those known in the art (lithium salt=lithia water) may be used. Examples of the supporting electrolyte include: inorganic acid anion salts such as $LiPF_6$, $LiBF_4$, $LiClO_4$, $LiAsF_6$, $LiTaF_6$, $LiAlCl_4$, $Li_2B_{10}Cl_{10}$ and the like; organic acid anion salts such as $LiCF_3SO_3$, $Li(CF_3SO_2)_2N$, $Li(C_2F_5SO_2)_2N$ and the like; and the like. The above supporting electrolytes may be used alone or in combination of two or more types thereof. Moreover, amount of the supporting electrolyte added to the non-aqueous solvent is not specifically limited and therefore the above amount may be the one conventionally used. A mole ratio (concentration) of the supporting electrolyte in the non-aqueous solvent is preferably 0.5 $mol/dm^3$ to 2 $mol/dm^3$. The above range of mole ratio can bring about a sufficient reactivity (ion conductivity).

<Operation (2)>

In the operation (2), the matrix polymer, supporting electrolyte and polymerizing initiator are added to the electrolytic solution prepared in the operation (1), to thereby prepare the electrolytic precursor solution. Herein, the matrix polymer is preferably the polymer electrolyte as set forth above. Polyethylene oxide (PEO), polypropylene oxide (PPO) and a copolymer thereof are more preferable. The polyethylene oxide (PEO) is especially preferable. In this case, the electrolyte of the separator layer may be used alone or in combination of two or more types thereof. Moreover, the electrolyte of the separator layer may be the same as or different from an ion conductive polymer used for at least one of the positive electrode layer and negative electrode layer of the secondary battery under the present invention, to be described afterward. Being the same is more preferable.

In the operation (2), the polymerizing initiator is added for acting on a cross-linking base of the matrix polymer (polymer electrolyte), so as to progress cross-liking reaction. According to external factors for allowing the polymerizing initiator to act as an initiator, the polymerizing initiator is categorized into a photo polymerizing initiator, a thermal polymerizing initiator and the like. Examples of the polymerizing initiator include azobisisobutyronitrile (AIBN) as the thermal polymerizing initiator, benzyl dimethyl ketal (BDK) as the photo polymerizing initiator, and the like. Preferably, the azobisisobutyronitrile (AIBN) as the thermal polymerizing initiator is used. Amount of the polymerizing initiator added to the electrolytic solution is not specifically limited. The polymerizing initiator is preferably added by 100 mass ppm to 10,000 mass ppm relative to the matrix polymer, and more preferably 100 mass ppm to 1,000 mass ppm.

<Operation (3)>

Then, in the operation (3), the separator substrate is dipped in the electrolytic precursor solution prepared in the operation (2). In this case, the separator substrate is not specifically limited and therefore those known in the art may be used. Examples of the separator substrate include: polyolefin resins such as fine-pore polyethylene film, fine-pore polypropylene film and fine-pore ethylene-propylene polymer film, porous film or nonwoven fabric of component(s) such as aramid, polyimide and cellulose, a stack structure of component(s) such as aramid, polyimide and cellulose, and the like. The above can bring about an excellent effect of suppressing the separator substrate's reactivity with the electrolyte (electrolytic solution). Other examples of the separator substrate include a complex resin film which is made by using polyolefin resin nonwoven fabric or polyolefin resin porous film as a reinforcing material layer and filling vinylidene fluoride resin compound in the reinforced material layer.

Thickness of the separator substrate may be properly determined according to application. For a secondary battery for driving a motor of an automobile and the like, the separator substrate preferably has a thickness of 1 μm to 100 μm. Moreover, porosity, size and the like of the separator substrate may be properly determined in view of characteristics of the prepared secondary battery. For example, voidage (porosity)

of the separator substrate is preferably 30% to 80%, and more preferably 40% to 70%. The separator substrate having voidage of 40% to 70% can bring about a secondary battery causing a higher output. Curvature of the separator layer is preferably 1.2 to 2.8. The separator substrate having the above voidage (porosity) can sufficiently introduce the electrolytic solution and the separator layer's electrolyte, and can sufficiently keep a strength of the separator layer.

Moreover, conditions for dipping the separator substrate in the electrolytic precursor solution is not specifically limited as long as the electrolytic precursor solution sufficiently interpenetrates in the separator substrate. Specifically, the following dipping conditions are preferable: 15° C. to 60° C., and more preferably 20° C. to 50° C.; 1 min to 120 min, and more preferably 5 min to 60 min. After the dipping under a certain condition, an excessive electrolytic precursor solution is to be removed. The removing method is not specifically limited and therefore those known in the art may be used. For example, the following removing methods are preferable:

First method: i) Between parting films, sandwiching the separator substrate including the interpenetrated electrolytic precursor solution, and
  ii) slightly brandishing the separator substrate with rolling and the like.

Second method: Slightly squeezing the separator substrate including the interpenetrated electrolytic precursor solution.

<Operation (4)>

Moreover, in the operation (4), the separator impregnated in the operation (3) is sandwiched by the positive electrode layer and the negative electrode layer, followed by polymerizing of the electrolyte of the impregnated separator, to thereby adhere the separator layer to each of the positive electrode layer and the negative electrode layer. With the impregnated separator thus sandwiched by the positive electrode layer and the negative electrode layer, a part of the electrolytic precursor solution in the impregnated separator moves to interfaces between the positive electrode layer and the separator layer and between the negative electrode layer and the separator layer. Polymerizing in this state is considered to bring about the following effect. The electrolytes (the matrix polymer of gel electrolyte and the matrix polymer of intrinsic polymer electrolyte) in the separator layer and in the above interfaces mutually form a cross-liking structure for adhesion, thus bringing about an excellent mechanical strength. The above adhesion mechanism is merely based on a supposition and is not limited thereto. Moreover, the polymerizing method is not specifically limited as long as the above cross-linking structure is formed. Examples of the polymerizing method include thermal polymerizing, photo polymerizing (especially, ultraviolet polymerizing, radiation polymerizing and electron beam polymerizing) and the like to be implemented on the electrolyte {such as polyethylene oxide (PEO) and polyphenylene oxide (PPO)} of the separator layer. The thermal polymerizing is more preferable.

In the operation (4), after the sandwiching of the impregnated separator by the positive electrode layer and negative electrode layer and before the polymerizing of the electrolyte of the separator layer, it is preferable that the stack structure of the positive electrode layer, impregnated separator and negative electrode layer is fixed with two plates (for example, glass, parting film and the like). Moreover, it is preferable that the polymerizing reaction is implemented in a laminate bag and the like. As such, the stack structure's deviation in the direction along the face can be prevented and the film thickness variation of the stack structure in the polymerizing can be prevented.

In the operation (4), polymerizing conditions are not specifically limited as long as the separator layer can have a sufficient contact with each of the positive electrode layer and the negative electrode layer. In the case of the thermal polymerizing, for example, heating the stack structure of the positive electrode layer, impregnated separator and negative electrode layer in the following conditions is preferable: 20° C. to 150° C., more preferably 30° C. to 100° C.; 10 min to 10 hr, more preferably 30 min to 5 hr.

In the operation (4), the positive electrode layer and the negative electrode layer can be formed in a known method, except that the positive and negative electrode layers are each free from electrolyte. Specifically, the positive electrode layer and the negative electrode layer respectively may include positive electrode active material and negative electrode active material, or if necessary, may include electrolytic salt for enhancing ion conductivity, conductivity assistant for enhancing electron conductivity, binder and the like.

<Positive Electrode Active Material>

Herein, the positive electrode active material has such a composition as to occlude ions during discharging while discharge ions during charging. One preferable example of the positive electrode active material is a composite oxide including transition metal and lithium. Examples of the positive electrode active material include: Li—Co composite oxide such as $LiCoO_2$, Li—Ni composite oxide such as $LiNiO_2$, Li—Mn composite oxide such as spinel $LiMn_2O_4$, Li—Fe composite oxide such as $LiFeO_2$, and the one having a part of the above transition metals which part is substituted with another element. The above lithium-transition metal composite oxides are materials excellent in reactivity as well as cyclic durability and low in cost. Therefore, using the above lithium-transition metal composite oxides for the electrode works for forming a battery having an excellent output characteristic. Other examples of the positive electrode active material include: phosphoric acid compound (including transition metal and lithium) such as $LiFePO_4$, and sulfuric acid compound; transition metal oxide or transition metal sulfide such as $V_2O_5$, $MnO_2$, $TiS_2$, $MoS_2$ and $MoO_3$; $PbO_2$, AgO, NiOOH; and the like. The above positive electrode active materials may be used alone or in combination of two or more types thereof. An average particle diameter of the positive electrode active material is not specifically limited, preferably 1 μm to 100 μm and more preferably 1 μm to 20 μm in view of the positive electrode active material's higher capacity, reactivity and cyclic durability. Within the above range, the secondary battery can be prevented from having an increased internal resistance which may be caused during charging and discharging under a high output condition, thus taking out a sufficient current. In the case of the positive electrode active material being a secondary particle, it is preferable that a primary particle which is a constituent of the secondary particle has an average particle diameter of 10 nm to 1 μm, but not necessarily limited thereto under the present invention. Depending on the production method, however, it is not necessary that the positive electrode active material is made into the secondary particle by aggregation or agglomeration. The particle diameter of the positive electrode active material and the diameter of the primary particle each are a median obtained by a laser diffraction method. Shape of the positive electrode active material varies with type, production method and the like, examples thereof including sphere (powder), plate, needle, column, edge and the like, but not limited thereto. Preferably, an optimum shape of the positive electrode active material is selected so as to accomplish improvement of the battery performance such as charging and discharging.

<Negative Electrode Active Material>

Moreover, the negative electrode active material has such a composition as to discharge ions during discharging while occlude ions during charging. Examples of the negative electrode active material include: metals such as Si and Sn, metal oxides such, as TiO, $Ti_2O_3$ and $TiO_2$ or $SiO_2$, SiO and $SnO_2$, composite oxides (including lithium and transition metal) such as $Li_{4/3}Ti_{5/3}O_4$ and $Li_7MnN$, Li—Pb alloy, Li—Al alloy, Li, and carbon materials such as natural graphite, artificial graphite, carbon black, active carbon, carbon fiber, coke, soft carbon and hard carbon. The above negative electrode active materials may be used alone or in combination of two or more types thereof. An average particle diameter of the negative electrode active material is not specifically limited, preferably 1 µm to 100 µm and more preferably 1 µm to 20 µm in view of the negative electrode active material's higher capacity, reactivity and cyclic durability. Within the above range, the secondary battery can be prevented from having an increased internal resistance which may be caused during charging and discharging under a high output condition, thus taking out a sufficient current. In the case of the negative electrode active material being a secondary particle, it is preferable that a primary particle which is a constituent of the secondary particle has an average particle diameter of 10 nm to 1 µm, but not necessarily limited thereto under the present invention. Depending on the production method, however, it is not necessary that the negative electrode active material is made into the secondary particle by aggregation or agglomeration. The particle diameter of the negative electrode active material and the diameter of the primary particle each are a median obtained by a laser diffraction method. Shape of the negative electrode active material varies with type, production method and the like, examples thereof including sphere (powder), plate, needle, column, edge and the like, but not limited thereto. Preferably, an optimum shape of the negative electrode active material is selected so as to accomplish improvement of the battery performance such as charging and discharging.

<Electrolytic Salt>

The electrolytic salt is not specifically limited, examples thereof including: BETI {lithiumbis, (perfluoroethylene sulfonylimide); otherwise denoted by $Li(C_2F_5SO_2)_2N$}, $LiBF_4$, $LiPF_6$, $LiN(SO_2CF_3)_2$, $LiN(SO_2C_2F_5)_2$, LiBOB (lithiumbis oxide borate) and an arbitrary combination thereof.

<Conductivity Assistant>

Examples of the conductivity assistant include acetylene black, carbon black, ketjen black, vapor grown carbon fiber, carbon nanotube, expanded graphite, graphite and the like, but not specifically limited thereto.

<Binder>

Examples of the binder include polyvinylidene fluoride (PVDF), styrene butadiene rubber (SBR), polyimide, polytetrafluoroethylene (PTFE) and the like, but not specifically limited thereto.

<Positive Electrode Layer, Negative Electrode Layer and Current Collector>

The positive electrode layer and the negative electrode layer each have such a structure that the active material layer including the electrolyte, electrolytic salt, conductive assistant and binder is ordinarily formed on a proper current collector. The material for the current collector is not specifically limited, examples thereof including at least one selected from the group consisting of iron, chromium, nickel, manganese, titanium, molybdenum, vanadium, niobium, aluminum, copper, silver, gold, platinum and carbon, more preferably at least one selected from the group consisting of aluminum, titanium, copper, nickel, silver and stainless (SUS). The above materials for the current collector may have a single-layer structure (e.g. foil) or a multi-layer structure including different types of materials. Otherwise, a clad material coated with the above materials (e.g. a clad material including nickel and aluminum or a clad material including copper and aluminum) may be used. Moreover, a plating material which is a combination of the above current collector materials may be preferably used. Furthermore, a surface of a metal (other than aluminum) which is any of the above current collector materials may be coated with aluminum which is another current collector material. As the case may be, metal foils which are two or more of the above current collector materials may be attached and mated for forming the current collector to be used. The above materials are excellent in corrosion resistance, conductivity, machinability and the like. The current collector has a typical thickness of 5 µm to 50 µm but not specifically limited thereto.

Size of the current collector is determined according to the application of the battery. The current collector has a large area for preparing a large electrode for a large battery while having a small area for preparing a small electrode for a small battery.

A method of forming the positive electrode (negative electrode as well) on the surface of the current collector is not specifically limited and therefore those known in the art may be likewise used. For example, as set forth above, the positive electrode active material (or the negative electrode active material), or if necessary, the electrolytic salt for enhancing ion conductivity, conductive assistant for enhancing electron conductivity, and binder is/are dispersed or dissolved in a proper solvent, to thereby prepare a positive electrode active material solution (or a negative electrode active material solution). Then, the thus prepared positive electrode active material solution (negative electrode active material solution) is applied to the current collector, followed by drying for removing the solvent, and still followed by pressing, to thereby form the positive electrode layer (or negative electrode layer) on the current collector. In the above operations, the solvent is not specifically limited, examples thereof including N-methyl-2-pyrrolidone (NMP), dimethyl formamide, dimethyl acetoamide, methyl formamide, cyclohexane, hexane and the like. For polyvinylidene fluoride (PVDF) as the binder, NMP is preferable as the solvent.

In the above method, after the positive electrode active material solution (or negative electrode active material solution) is applied to the current collector and followed by drying, pressing is implemented. Adjusting the pressing conditions can control the voidage of the positive electrode layer (or negative electrode layer).

Measures or conditions for the pressing are not specifically limited, and therefore can be properly adjusted such that the positive electrode layer (or negative electrode layer) has a proper voidage after the pressing. Examples of measures for the pressing include hot press, calendar roll press and the like. Moreover, the pressing conditions (temperature, pressure and the like) are not specifically limited and therefore those conventionally known may be used.

Thickness of each of the positive electrode layer and the negative electrode layer is not specifically limited, preferable examples thereof including 10 µm to 200 µm, especially 20 µm to 100 µm. In this case, the positive electrode layer and the negative electrode layer may have the same thickness or different thicknesses.

Moreover, each of the positive electrode layer and the negative electrode layer may have a single-layer structure or a multi-layer stack structure. The number of layers for the multi-layer stack structure is not specifically limited, a preferable example thereof being 1 to 3 in view of liquid electrolyte's injecting property (how easy to inject) and ion conductivity which are to be described afterward.

In the case of the positive electrode layer and the negative electrode layer each having a multi-layer stack structure, it is preferable that such multiple layers have different voidages in the thickness direction of the negative electrode layer. Herein, at least one of the positive electrode layer and the negative electrode layer has the above multiple-layer stack structure having different voidages. Preferably, however, at least the negative electrode layer has the above structure. Moreover, the above multi-layer stack structure can be accomplished by repeatedly forming the positive electrode layers (negative electrode layers as well) through the above method.

Typically, for injecting the liquid electrolyte in the direction along the surface of the stack structure, the liquid electrolyte is most unlikely to be permeated around a center area of each layer. Therefore, injecting the liquid electrolyte in each step may cause a portion where the liquid electrolyte is not permeated. Therefore, as set forth above, at least one coarse layer (i.e., grooved layer) present in the direction along the surface can progress the liquid electrolyte to permeate in the direction along the face. The direction of surface depth has a short distance for the liquid electrolyte to permeate. Therefore, in the direction of surface depth, the liquid electrolyte can sufficiently permeate and secure a sufficient ion conductivity. Herein, in the case of the positive electrode layer and the negative electrode layer each having a single-layer structure, such single layer preferably has a voidage of 30% to 60%. Likewise, in the case of the positive electrode layer and the negative electrode layer each having a multi-layer stack structure, each of the multiple layers preferably has a voidage of 30% to 60%. Each layer having a voidage of 30% or more can secure a sufficient void, providing a sufficient amount of liquid material permeated. On the contrary, each layer having a voidage of 60% or less can secure a sufficient capacity for the secondary battery. Moreover, for impregnating the polymer electrolytic precursor in the electrode layer, the voidage of 30% to 60% can likewise progress permeation of the electrolyte.

The above operations (1) to (4) can adhere the separator layer to each of the positive electrode layer and the negative electrode layer. Then, a liquid material (liquid electrolyte) is injected to the thus obtained stack structure of the positive electrode layer, separator layer and negative electrode layer (injecting operation). Specifically, the preferable method of producing the secondary battery under the present invention includes the following operations: adhering the separator layer to each of the positive electrode layer and the negative electrode layer, to thereby prepare a stack structure of the positive electrode layer, separator layer and negative electrode layer, then, injecting the liquid electrolyte to the stack structure. The above operations (1) to (4) in combination with the injecting operation can form the stack structure of the positive electrode layer, separator layer and negative electrode layer, where each of the positive electrode layer and the negative electrode layer has an electrolyte which is a liquid material (liquid electrolyte) while the separator layer has a polymer electrolyte. Otherwise, as set forth above under the present invention, it is not necessary that both of the negative electrode layer and the positive electrode layer have the electrolyte which is a liquid material. For example, in the case of the negative electrode layer having an electrolyte which is a liquid material and the positive electrode layer having an electrolyte which is a polymer electrolyte, the secondary battery can be produced in the following operations: First, the positive electrode layer produced in the above method is dipped in the electrolytic precursor solution prepared in the operation (2), to thereby form a positive electrode layer including electrolyte. Then, like the operation (4), the impregnated separator prepared in the operation (3) is sandwiched by the positive electrode layer and the negative electrode layer, followed by polymerizing of the electrolyte of the impregnated separator, to thereafter adhere the separator layer to each of the positive electrode layer and the negative electrode layer. Otherwise, the operation (4) may be repeated, except for using the following positive electrode layer: A positive electrode layer which is prepared in a manner like a known method, that is, in such a state as to include an electrolyte.

In the above injecting operations, the injecting method is not specifically limited as long as the liquid electrolyte is sufficiently permeated in the positive electrode layer and the negative electrode layer each not including electrolyte. Specifically, the following injecting methods are preferable:

Method 1:
putting the stack structure of the positive electrode layer, separator layer and negative electrode layer into a laminate bag, and
injecting the electrolytic solution to the laminate bag.

Method 2 (vacuum impregnating operation):
putting the stack structure of the positive electrode layer, separator layer and negative electrode layer into a laminate bag,
injecting the electrolytic solution to the laminate bag, and
packing the laminate in a vacuum state.

Herein, the stack structure of the positive electrode layer, separator layer and negative electrode layer has the separator layer adhered to each of the positive electrode layer and the negative electrode layer. Therefore, the method 2 (vacuum impregnating operation) is preferable. In the method 2, the electrolytic solution can permeate to such an extent as to reach the layers' adhesion parts or the electrode layer's central part, where the electrolytic solution is unlikely to permeate in the central part.

In sum, the more preferable method of producing the secondary battery under the present invention includes the following sequential operations: adhering the separator layer to each of the positive electrode layer and the negative electrode layer, to thereby prepare the stack structure of the positive electrode layer, separator layer and negative electrode layer, injecting the liquid electrolyte into the stack structure, and vacuum impregnation.

In the above injecting operation, it is preferable that a pressure is applied in a direction perpendicular to the surface of the stack structure (i.e., thickness direction of stack structure), so as not to change (or causing a small variation is allowed) thickness of the stack structure of the positive electrode layer, separator layer and negative electrode layer. The above applying of the pressure can be accomplished, for example, by sandwiching the stack structure by two glass plates. In the operation (4), the stack structure sandwiched by two glass plates is put into the laminate bag during the thermal polymerizing operation. It is preferable that the stack structure in this state is subjected to the injecting operation. Moreover, in the injecting operation, the pressure to be applied in the direction perpendicular to the surface of the stack structure (i.e., thickness direction of stack structure) is not specifically limited as long as such a pressure does not change (or causing a small variation is allowed) thickness of the stack structure during the injecting operation. For example, the following pressing operations are preferably used: securing two glass plates with a clip and the like so as to keep thickness of the stack structure, and pressing the stack structure with a spring and the like. Preferably, the thickness of the stack structure in the injecting operation is so adjusted as to have a variation less than or equal to 5% of a certain thickness (distance between two glass plates when the stack structure is sandwiched therebetween), and more preferably 0.01% to 1% of the certain thickness.

<Groove of Current Collector>

Moreover, under the present invention, when the current collector used in the forming of the positive electrode layer and negative electrode layer is flat like a foil, it is preferable to form a groove on the surface of the current collector so as to improve the electrolyte (polymer electrolytic precursor or liquid electrolyte)'s permeability to the central part. It is preferable that the positive electrode layer including the positive electrode active material is formed on the current collector having the groove which has width and depth each less than or equal to 10% of an average particle diameter of the positive electrode active material. It is likewise preferable that the negative electrode layer including the negative electrode active material is formed on the current collector having the groove which has width and depth each less than or equal to 10% of an average particle diameter of the negative electrode active material. Shape and size of the groove are not specifically limited. For example, cross section of the groove is not specifically limited as long as the electrolytic solution easily interpenetrates in the current collector, examples of the cross section of the groove shape including square, rectangle, quadrangle, equilateral triangle, isosceles triangle, triangle, semicircle, semiellipse and the like. The groove may have an arbitrary size as long as the electrolytic solution is likely to interpenetrate in the current collector. Preferably, the width of the groove is less than or equal to 10% of the average particle diameter of each of the positive electrode active material (in the case of positive electrode layer) and the negative electrode active material (in the case of negative electrode layer). Preferably, the depth of the groove is less than or equal to 10% of the average particle diameter of each of the positive electrode active material (in the case of positive electrode layer) and the negative electrode active material (in the case of negative electrode layer). Moreover, the groove's volume relative to the current collector's volume {(groove's total volume/current collector's volume)×100(%)} is preferably 1 volume % to 30 volume %. The groove having the above shape and size allows the electrolyte to sufficiently permeate to the electrode layer's central part into which the electrolyte is unlikely to permeate. Moreover, the direction for forming the groove is not specifically limited as long as such a direction allows the electrolytic interpenetration. Examples of the direction of groove include i) longitudinal and lateral in a form of a grid, ii) parallel in a constant direction, iii) honeycomb (hexagonal) and the like. Of the above, parallel in a constant direction, especially, the direction for injecting the electrolyte is preferable, thereby the electrolyte can be smoothly injected into the groove.

Moreover, the liquid electrolyte used for the above injecting operation is not specifically limited, for example, the electrolytic solution in the above operation (1) may be likewise used. In other words, the liquid electrolyte is prepared by dissolving the supporting electrolyte in the non-aqueous solvent. Examples of the non-aqueous solvent usable for the above injecting operation include: cyclic carbonates such as propylene carbonate and ethylene carbonate; chain carbonates such as dimethyl carbonate, methylethyl carbonate and diethyl carbonate; ethers such as tetrahydrofuran, 2-methyl tetrahydrofuran, 1,4-dioxane, 1,2-dimethoxy ethane, 1,2-dibutoxy ethane, 1,3-dioxolane and diethylether; lactones such as γ-butyrolactone; nitriles such as acetonitrile; esters such as methyl propionate, amides such as dimethyl formamide; esters such as methyl acetate and methyl formate; sulfolane; dimethyl sulfoxide; 3-methyl-1,3-oxazolidine-2-on; and the like. Preferably, ethylene carbonate and diethyl carbonate are used. The above non-aqueous solvents may be used alone or in combination of two or more types thereof. A mixture ratio in the case of combination is not specifically limited as long as the above mixture is capable of dissolving the supporting electrolyte, and the mixture ratio may be properly selected according to type of the non-aqueous solvent or according to a desired characteristic. For example, when ethylene carbonate (EC) is combined with diethyl carbonate (DEC), EC's volume relative to a total volume of EC and DEC is preferably 10 volume % to 80 volume %, and more preferably 20 volume % to 60 volume %.

Moreover, the supporting electrolyte is not specifically limited and those known in the art (lithium salt=lithia water) may be used. Examples of the supporting electrolyte include: inorganic acid anion salts such as $LiPF_6$, $LiBF_4$, $LiClO_4$, $LiAsF_6$, $LiTaF_6$, $LiAlCl_4$, $Li_2B_{10}Cl_{10}$ and the like; organic acid anion salts such as $LiCF_3SO_3$, $Li(CF_3SO_2)_2N$, $Li(C_2F_5SO_2)_2N$ and the like; and the like. The above supporting electrolytes may be used alone or in combination of two or more types thereof. Moreover, amount of the supporting electrolyte added to the non-aqueous solvent is not specifically limited and therefore the above amount may be the one conventionally used. A mole ratio (concentration) of the supporting electrolyte in the non-aqueous solvent is preferably 0.5 $mol/dm^3$ to 2 $mol/dm^3$. The above range of mole ratio can bring about a sufficient reactivity (ion conductivity).

The secondary battery of the present invention includes at least one of the electric cells prepared in the above manner. The electric cell of the present invention is received in a cell case and the like. The cell case is not specifically limited as long as such a cell case is resistant to an external shock or an environmental deterioration when the cell is used. For example, a cell case made of laminate materials having a compound stack of polymer films and metal foils can be used, where a periphery of the cell case is joined through heat sealing. In addition, another cell case has such a structure that an open part thereof (when such another cell case is in a form of a bag) is heat sealed, and a positive electrode lead terminal and a negative electrode lead terminal are lead out of the thus heat sealed part. The number of parts for taking out the respective positive and negative lead terminals is not limited to one. Moreover, the materials for the cell case are not specifically limited to the above, other examples thereof including plastic, metal, rubber and the like, or an arbitrary combination thereof. Shape of the cell case is not specifically limited, examples thereof including film, plate, box and the like. Moreover, providing a terminal for conducting an inside with an outside of the cell case is allowed. In this structure, for taking out the current, the current collector is connected to the inside of the terminal while the lead terminal is connected to the outside of the terminal.

<Structure of Secondary Battery>

Configuration or structure of the secondary battery of the present invention is not specifically limited, examples thereof including stack (flat), rolled (cylindrical) and the like which are conventionally known in the art. Moreover, in view of electrical connection (electrode structure) in the lithium ion secondary battery, the secondary battery of the present invention may have an internal parallel connection or an internal serial connection.

Under the present invention, adopting the stack (flat) battery structure can secure a long-term reliability due to a sealing technology such as an easy thermocompression bonding, which is advantageous in terms of cost and workability (operatability).

Referring to drawings, a lithium ion secondary battery having an internal parallel connection and a lithium ion secondary battery having an internal serial connection under the present invention are to be set forth. The present invention is, however, not limited thereto.

First Embodiment

FIG. 2 shows a typical lithium ion secondary battery, according to a first embodiment of the present invention. More specifically, FIG. 2 shows a schematic of a cross sectional view of an entire structure of a flat (stack) non-bipolar lithium ion secondary battery (hereinafter, otherwise referred to as "non-bipolar lithium ion secondary battery" or "non-bipolar secondary battery" for short).

As shown in FIG. 2, a non-bipolar lithium ion secondary battery 10 according to the first embodiment has a cell outer package 22 using a composite laminate film including polymer and metal. Joining entirety of the periphery of the laminate film through heat sealing brings about such a structure that a generating element (cell element) 17 is sealed and received in the cell outer package 22. Herein, the generating element 17 has such a structure that a positive electrode plate, a separator layer 13 and a negative electrode plate are stacked, where the positive electrode plate has a positive electrode current collector 11 having first and second faces each formed with a positive electrode (positive electrode active material layer) 12 while the negative electrode plate has a negative electrode current collector 14 having first and second faces each formed with a negative electrode (negative electrode active material layer) 15. In the above structure, via the separator layer 13, the positive electrode (positive electrode active material layer) 12 on the first face of the first positive electrode plate faces the negative electrode (negative electrode active material layer) 15 on the first face of the first negative electrode plate adjacent to the first positive electrode plate, thus forming a plurality of the positive electrode plates, separator layers 13 and negative electrode plates which are stacked.

With the above structure, the positive electrode (positive electrode active material layer) 12, separator layer 13 (adjacent to the positive electrode 12) and negative electrode (negative electrode active material layer) 15 (adjacent to the separator layer 13) in combination form a single electric cell layer 16. With a plurality of stacked electric cell layers 16, the lithium ion secondary battery 10 of the first embodiment has such a structure that the electric cell layers 16 are electrically connected in parallel. In addition, each of outermost positive electrode current collectors 11a positioned in respective outermost parts (uppermost and lowermost in FIG. 2) of the generating element (cell element; stack structure) 17 has one face alone that is formed with the positive electrode (positive electrode active material layer) 12. Otherwise, the structure in FIG. 2 may be so modified that each of outermost negative electrode current collectors (not shown in FIG. 2) positioned in respective outermost parts (uppermost and lowermost in FIG. 2) of the generating element (cell element; stack structure) 17 has one face alone that is formed with the negative electrode (negative electrode active material layer) 15.

Moreover, a positive electrode tab 18 and a negative electrode tab 19 conductive with the respective positive electrode plate and negative electrode plate are mounted to the respective positive electrode current collector 11 and negative electrode current collector 14 via a positive electrode terminal lead 20 and a negative electrode terminal lead 21 respectively, where an ultrasonic welding, a resistance welding or the like works for the above mounting operation. As such, being sandwiched by the heat sealed portions, the positive electrode tab 18 and the negative electrode tab 19 each are exposed outward from the cell outer package 22.

Second Embodiment

FIG. 3 shows a typical bipolar lithium ion secondary battery, according to a second embodiment of the present invention. More specifically, FIG. 3 shows a schematic of a cross sectional view of an entire structure of a flat (stack) bipolar lithium ion secondary battery (hereinafter, otherwise referred to as "bipolar lithium ion secondary battery" or "bipolar secondary battery" for short).

As shown in FIG. 3, a bipolar lithium ion secondary battery 30 according to the second embodiment has such a structure that a substantially rectangular generating element (cell element) 37 for actually promoting charging and discharging reactions is sealed and received in a cell outer package 42. As shown in FIG. 3, the generating element (cell element) 37 of the bipolar lithium ion secondary battery 30 according to the second embodiment has such a structure that two or more of the bipolar electrodes 34 sandwich therebetween a separator layer 35. Hereinabove, via the separator layer 35, a positive electrode (positive electrode active material layer) 32 of the bipolar electrode 34 opposes a negative electrode (negative electrode active material layer) 33 of the adjacent bipolar electrode 34. Herein, the bipolar electrode 34 has a current collector 31 having a first face formed with the positive electrode (positive electrode active material layer) 32 and a second face formed with the negative electrode (negative electrode active material layer) 33. In other words, the bipolar lithium ion secondary battery 30 has such a structure that the generating element 37 includes a plurality of bipolar electrodes 34 which are stacked via the separator layers 35.

The positive electrode (positive electrode active material layer) 32, the separator layer 35 (adjacent to the positive electrode 32) and the negative electrode (negative electrode active material layer) 33 (adjacent to the separator layer 35) form a single electric cell layer 36 (otherwise referred to as "cell unit" or "unit cell"). As such, it is also interpreted that the bipolar lithium ion secondary battery 30 has such a structure that the electric cell layers 36 are stacked. Moreover, the periphery of the electric cell layer 36 has a seal portion (insulator layer) 43 for preventing a liquid junction attributable to the electrolytic solution leaking from the separator layer 35. Providing the seal portion (insulator layer) 43 can insulate the adjacent current collectors 31 from each other, and prevent a short circuit which may be caused by a contact between the positive electrode 32 and the negative electrode 33 adjacent to each other via the separator layer 35.

In addition, an outermost positive electrode side electrode 34a and an outermost negative electrode side electrode 34b of the generating element (cell element) 37 may have a structure other than a bipolar electrode. In other words, the electrodes 34a, 34b may have the respective positive electrode (positive electrode active material layer) 32 and negative electrode (negative electrode active material layer) 33 each disposed only on the first face which is necessary for one of the respective current collectors 31a, 31b (or terminal plates). Specifically, the positive electrode (positive electrode active material layer) 32 may be disposed only on the first face of the positive electrode side outermost current collector 31a in the generating element (cell element) 37. Likewise, the negative electrode (negative electrode active material layer) 33 may be disposed only on the first face of the negative electrode side outermost current collector 31b in the generating element (cell element) 37. Moreover, the bipolar lithium ion secondary battery 30 has such a structure that a positive electrode tab 38 and a negative electrode tab 39 are connected respectively to the positive electrode side outermost current collector 31a (uppermost) and the negative electrode side outermost current collector 31b (lowermost), when necessary, via a positive electrode terminal lead 40 and a negative electrode terminal lead 41 respectively. Otherwise, extension of the positive electrode side outermost current collector 31a may serve as the positive electrode tab 38 to be lead out of the cell outer package 42 which is a laminate sheet, likewise, extension of the negative electrode side outermost current collector 31b may serve as the negative electrode tab 39 to be lead out of the cell outer package 42 which is a laminate sheet.

Moreover, for preventing an external shock or an environmental deterioration during usage, the bipolar lithium ion secondary battery 30 may have such a structure that the generating element (cell element; stack structure) 37 is enclosed in the cell outer package 42 in a depressurized manner and the positive electrode tab 38 and the negative electrode tab 39 are taken out of the cell outer package 42. The basic structure of the bipolar lithium ion secondary battery 30 has a plurality of stacked electric cell layers 36 (cell units or unit cells) connected in series.

As set forth above, structural elements and production methods of each of the non-bipolar lithium ion secondary battery 10 and the bipolar lithium ion secondary battery 30 are substantially the same, except that the electric connection (electrode structure) in the lithium ion secondary batteries 10, 30 are different from each other, i.e., "connected in parallel" for the former while "connected in series" for the latter. Moreover, the non-bipolar lithium ion secondary battery 10 and bipolar lithium ion secondary battery 30 of the present invention can be used for pack batteries and vehicles.

Third Embodiment

External Structure of Lithium Ion Secondary Battery

Figure 4:
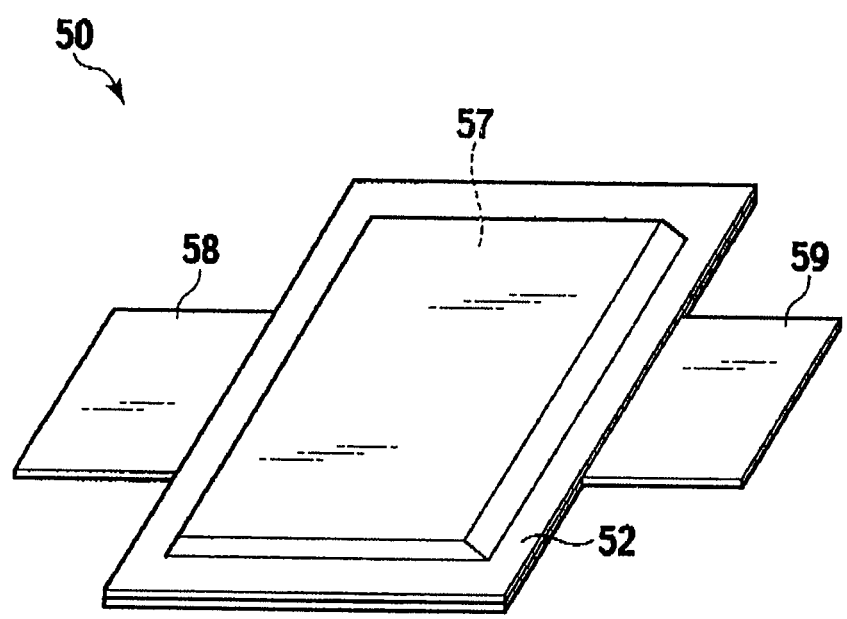
FIG. 4 shows a typical lithium ion secondary battery, that is, a perspective view of a flat stack non-bipolar or bipolar lithium ion secondary battery, according to the third embodiment of the present invention.

FIG. 4 shows a typical lithium ion secondary battery, that is, a perspective view of a flat stack non-bipolar or bipolar lithium ion secondary battery, according to a third embodiment of the present invention.

As shown in FIG. 4, a flat stack lithium ion secondary battery 50 is flat and rectangular, with first and second sides thereof formed respectively with a positive electrode tab 58 and a negative electrode tab 59 for taking out electric power. A generating element (cell element) 57 is packed with a cell outer package 52 of the lithium ion secondary battery 50 and has a periphery which is heat sealed. The generating element 57 is sealed in such a state the positive electrode tab 58 and the negative electrode tab 59 are pulled out. Herein, the generating element (cell element) 57 is a counterpart of each of the generating element (cell element) 17 of the non-bipolar lithium ion secondary battery 10 in FIG. 2 and the generating element (cell element) 37 of the bipolar lithium ion secondary battery 30 in FIG. 3. Moreover, the generating element (cell element) 57 is a stack of the electric cell layers (electric cells) 16, 36 including the positive electrodes (positive electrode active material layers) 12, 32, separator layers 13, 35 and negative electrodes (negative electrode active material layers) 15, 33.

In addition, configuration of the lithium ion secondary battery of the present invention is not specifically limited to being stacked and flat as shown in FIG. 2 and FIG. 3, other examples thereof including rolled lithium ion secondary battery which is cylindrical. Otherwise, the above cylinder may be modified into a rectangular flat configuration. The above cylindrical lithium ion secondary battery may have an outer package using a laminate film or a conventional cylindrical can (metal can).

Moreover, the sides for taking out the positive and negative electrode tabs 58, 59 are not specifically limited to those shown in FIG. 4. The positive and negative electrode tabs 58, 59 may be taken out from the same side. Otherwise, a plurality of positive electrode tabs 58 and a plurality of negative electrode tabs 59 may be taken out from first and second sides respectively. Moreover, in the case of the rolled lithium ion secondary battery, for serving as a terminal, the cylindrical can (or metal can) can replace the positive and negative electrode tabs 58, 59.

As a high capacity power source for an electric car, a hybrid electric car, a fuel cell car, and a hybrid fuel cell car and the like, the lithium ion secondary battery of the present invention can be preferably used for a vehicle driving power source or an auxiliary power source for causing demanded high volume energy density and high volume output density.

Fourth Embodiment

Pack Battery

A pack battery of the present invention has such a structure that a plurality of lithium ion secondary batteries of the present invention are connected together, more in detail, two or more of the lithium ion secondary batteries are connected in series, parallel or both. Connecting the lithium ion secondary batteries in series or parallel can arbitrarily adjust capacity and voltage of the batteries. Otherwise, the pack battery of the present invention may have such a structure that the non-bipolar lithium ion secondary battery (or batteries) and bipolar lithium ion secondary battery (or batteries) of the present invention are connected in series, parallel or both.

FIG. 5A, FIG. 5B and FIG. 5C show a typical pack battery, according to a fourth embodiment of the present invention, where FIG. 5A is a plan view of the pack battery, FIG. 5B is a front view of the pack battery and FIG. 5C is a side view of the pack battery.

As shown in FIG. 5A, FIG. 5B and FIG. 5C, a pack battery 300 of the present invention has such a structure that a plurality of lithium ion secondary batteries are connected in series or parallel, thus forming a small pack battery 250 which is attachable and detachable. Moreover, a plurality of small pack batteries 250 are connected in series or parallel, to thereby form the high-capacity and high-output pack battery 300 which is proper for a vehicle driving power source or an auxiliary power source for causing demanded high volume energy density and high volume output density. With FIG. 5A, FIG. 5B and FIG. 5C respectively showing plan view, front view and side view of the pack battery 300, the small pack batteries 250 (attachable-detachable) thus prepared are mutually connected by means of electric connectors such as bus bar and are stacked by means of a connecting jig 310. How many non-bipolar or bipolar lithium ion secondary batteries are connected for preparing the small pack battery 250 and how many small pack batteries 250 are stacked for preparing the pack battery 300 are determined according to cell capacity or output of the vehicle (electric car).

Fifth Embodiment

Vehicle

A vehicle of the present invention includes the lithium ion secondary battery of the present invention or the pack battery which is a combination of a plurality of above lithium ion secondary batteries. Using the high capacity positive electrode of the present invention can make a battery causing a high energy density, thus accomplishing a plug-in hybrid car featuring a long EV (=Electric Vehicle) travel distance and an electric car featuring a long travel distance per charge. In other words, under the present invention, the lithium ion secondary battery or the pack battery which is a combination of a plurality of lithium ion secondary batteries can be used for a driving source of the vehicle. Examples of the vehicle having a long life and a high reliability include four wheelers such as hybrid car, fuel cell car and electric car; two wheelers (motor bike); three wheelers and the like, where the four wheelers including passenger car, truck, commercial vehicle such as bus, mini vehicle and the like. The application of the lithium ion secondary battery or pack battery of the present invention is not specifically limited to car, other examples including various power sources of mobile bodies such as electric trains, installed power sources such as non-outage power source, and the like.

Figure 6:
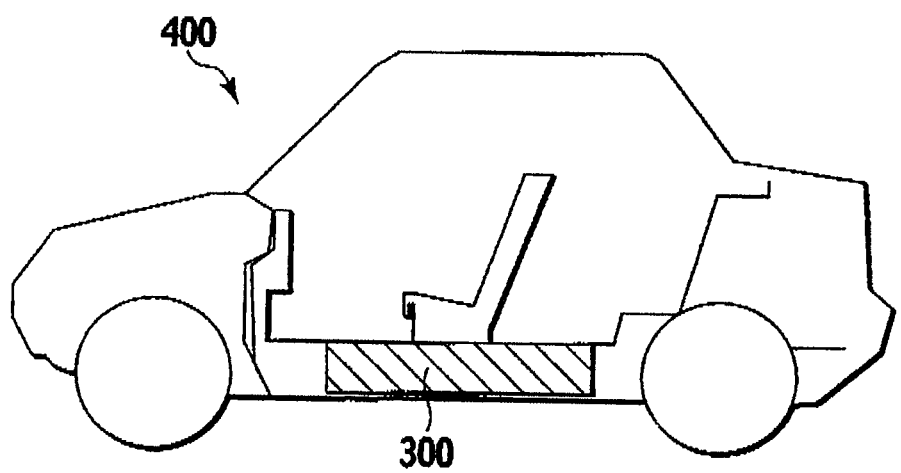
FIG. 6 is a schematic of a car including the pack battery, according to the fifth embodiment of the present invention.

FIG. 6 is a schematic of a car including the pack battery, according to a fifth embodiment of the present invention.

As shown in FIG. 6, the pack battery 300 is installed below a seat of a central part of a body of an electric car 400. Installing below the seat can keep a spacious passenger space and a wide trunk. The position for installing the pack battery 300 is, however, not limited to below the seat, other examples thereof including below a rear trunk, in a front engine room and the like. The electric car 400 including the above pack battery 300 has a high durability and keeps a sufficient output for a long-time operation. In addition, the above pack battery 300 works for providing an electric car, a hybrid car and the like which are excellent in fuel economy and traveling performance. The above pack battery 300 is also applicable to a hybrid car, a fuel cell car and the like, other than the electric vehicle 400 in FIG. 6.

EXAMPLES

Hereinafter, effects brought about by the present invention are to be set forth referring to the following examples and comparative examples. The scope of the present invention is, however, not limited to the examples.

Example 1

Preparation of Positive Electrode Layer

LiMn$_2$O$_4$ (average particle diameter: 10 μm) (90 mass part) as a positive electrode active material, carbon black (6 mass part) as a conductive assistant, and polyvinylidene fluoride (PVDF #1300) (4 mass part) as a binder were mixed. The thus prepared mixture as a positive electrode mixture was dispersed with N-methyl-2-pyrrolidone (50 mass part) as a solvent, to thereby obtain a slurry. The thus prepared slurry was applied to an aluminum (Al) foil (serving as a current collector and having a thickness of 20 μm), followed by pressing and drying, so as to finally prepare a positive electrode layer having a thickness of 70 μm. As such, the positive electrode layer was prepared.

[Preparation of Negative Electrode Layer]

An artificial graphite powder (average particle diameter: 10 μm) (90 mass part) as a negative electrode active material and polyvinylidene fluoride (PVDF #9200) (10 mass part) as a binder were dispersed with N-methyl-2-pyrrolidone (50 mass part) as a solvent, to thereby obtain a slurry. The thus obtained slurry was applied to a copper (Cu) foil (serving as a negative electrode current collector and having a thickness of 20 μm), followed by drying and pressing, so as to finally prepare a negative electrode layer having a thickness of 40 μm. As such, the negative electrode layer was prepared.

[Preparation of Electrolytic Solution]

Ethylene carbonate (30 volume part) and diethyl carbonate (70 volume part) were mixed as a solvent. Then, by a ratio of 1 mol/dm$^3$, LiPF$_6$ as a solute was added to the mixed solvent, to thereby prepare a non-aqueous electrolytic solution.

[Preparation of Solid Electrolytic Precursor Solution]

Polyethylene oxide as polymer electrolyte (40 mass %) was mixed with the non-aqueous electrolytic solution (60 mass %) prepared above. Azobisisobutyronitrile (AIBN) as a thermal polymerizing initiator equivalent to 5000 mass ppm relative to the polymer electrolyte was added to the above mixture, to thereby prepare a solid electrolytic precursor solution.

Polyolefin film {made of polyethylene (PE), thickness of 10 μm, voidage of 45%, curvature of 1.5} as a separator substrate was dipped in a vessel filled with the solid electrolytic precursor solution obtained above, followed by a vacuum impregnation at an ambient temperature for 1 hr. Then, the polyethylene film was sandwiched by parting films, then was lightly brandished with a roll for removing an excessive solid electrolytic precursor solution, to thereby obtain an impregnated separator. Then, the impregnated separator was sandwiched between the above prepared positive electrode layer and negative electrode layer, was put into a laminate bag, was sandwiched (for fixation) between two glass plates on both sides, followed by a thermal polymerizing in an oven at 80° C. for 3 hr, to thereby obtain a stack structure of the positive electrode layer, separator layer and negative electrode layer. As a result, the polymerizing of the solid electrolytic precursor works for forming the contact faces (between positive electrode layer and separator layer and between negative electrode layer and separator layer) in a state of adhesion. In this case, each of the positive electrode layer and negative electrode layer is free from entry of electrolytic solution.

Then, the electrolytic solution was injected to the stack structure (including the positive electrode layer, separator layer and negative electrode layer) sandwiched between the two glass plates, and then the stack structure was packed with a laminate in a vacuum state, to thereby prepare a stack secondary battery.

The thus prepared stack secondary battery has such a structure that the electrolyte of each of the negative electrode layer and the positive electrode layer is a liquid material while the electrolyte of the separator layer is a polymer. Moreover, in the stack secondary battery, each of the negative electrode layer and the positive electrode layer uses a liquid electrolyte having a conductivity of $2 \times 10^{-3}$ (S/cm) while the separator layer uses a gel polymer electrolyte having a conductivity of $6 \times 10^{-4}$ (S/cm). As such, the gel polymer electrolyte having a conductivity lower than that of the liquid electrolyte interpenetrated (held) in the positive electrode layer or negative electrode layer is interpenetrated (held) in the separator layer.

According to the following methods, charging and discharging characteristic tests were implemented on the thus prepared secondary battery. Table 1 shows results of the tests.

<Charging and Discharging Characteristic Test>

The charging and discharging characteristic test has the following conditions:

1: Constant current charging (charging at a certain charging current to such an extent as to obtain a certain charging voltage, then, keeping a total charging period of 15 hr at the certain charging voltage).

2: Rest (10 min).

3: Constant voltage discharging (discharging at a certain discharging current to such an extent as to obtain a certain discharging voltage).

4: Rest (10 min).

Hereinabove, certain charging current: 0.1 C, certain charging voltage: 4.2 V, and certain discharging voltage: 2 V.

1 C is defined as a current for fully (100%) charging a battery in 1 hr.

For example, 2 C is two times 1 C and capable of fully charging the battery in 30 min.

Moreover, the certain discharging current was adjusted to be 0.2 C for the first cycle, 0.5 C for the second cycle, and 0.2 C for the third cycle and thereafter.

Discharging efficiency was defined as a ratio of discharging capacity when the polymer electrolyte is used relative to discharging capacity when the liquid electrolyte alone is used as electrolyte at 0.1 C for charging and 0.2 C for discharging. In other words, the discharging efficiency is given by the following expression: Discharging efficiency (%)=(discharging capacity when polymer electrolyte is used/discharging capacity when liquid electrolyte alone is used as electrolyte)×100

Example 2

The method of the example 1 was repeated in the example 2, to thereby prepare the positive electrode layer. The thus prepared positive electrode layer was dipped in a vessel filled with a solid electrolytic precursor solution prepared like that according to the example 1, followed by a vacuum impregnation at an ambient temperature for 1 hr. Then, the positive electrode layer was sandwiched by parting films then was lightly brandished with a roll for removing an excessive solid electrolytic precursor solution, to thereby obtain an impregnated positive electrode layer.

Except that the thus prepared impregnated positive electrode layer was used as a positive electrode layer, the example 1 was repeated, i.e., the thermal polymerizing was implemented, to thereby obtain a stack structure of the positive electrode layer, separator layer and negative electrode layer. As a result, the polymerizing of the solid electrolytic precursor works for forming the contact faces (between positive electrode layer and separator layer and between negative electrode layer and separator layer) in a state of adhesion. In this case, the negative electrode layer is free from entry of electrolytic solution.

Then, the method of the example 1 was likewise repeated, to thereby prepare a stack secondary battery.

The thus prepared stack secondary battery has such a structure that the electrolyte of the negative electrode layer is a liquid material while the electrolyte of each of the separator layer and the positive electrode layer is a polymer. Moreover, in the stack secondary battery, the negative electrode layer uses a liquid electrolyte having a conductivity of $2\times10^{-3}$ (S/cm) while each of the separator layer and the positive electrode layer uses a gel polymer electrolyte having a conductivity of $6\times10^{-4}$ (S/cm). As such, the gel polymer electrolyte having a conductivity lower than that of the liquid electrolyte interpenetrated (held) in the negative electrode layer is interpenetrated (held) in the separator layer and positive electrode layer.

According to the following methods, charging and discharging characteristic tests were implemented on the thus prepared secondary battery. Table 1 shows results of the tests.

Example 3

Preparation of Positive Electrode Layer $LiMn_2O_4$ (average particle diameter: 10 µm) (90 mass part) as a positive electrode active material, carbon black (6 mass part) as a conductive assistant, and polyvinylidene fluoride (PVDF #1300) (4 mass part) as a binder were mixed. The thus prepared mixture as a positive electrode mixture was dispersed with N-methyl-2-pyrrolidone (50 mass part) as a solvent, to thereby obtain a slurry. The thus prepared slurry was applied to an aluminum (Al) foil (serving as a current collector and having a thickness of 20 µm), followed by drying and pressing, so as to finally prepare a positive electrode layer having a thickness of 36 µm. As such, a first positive electrode layer was prepared. In this case, the first positive electrode layer had a voidage of 35%. Then, the slurry like that set forth above was applied to the first positive electrode layer, followed by pressing (at a pressure lower than that for preparing the first positive electrode layer) and drying, so as to finally prepare a positive electrode layer having a thickness of 40 µm. As such, a second positive electrode layer was prepared. In this case, the second positive electrode layer had a voidage of 40%.

[Preparation of Negative Electrode Layer]

Artificial graphite powder (average particle diameter: 10 µm) (90 mass part) as a negative electrode active material and polyvinylidene fluoride (PVDF #9200) (10 mass part) as a binder were mixed were dispersed with N-methyl-2-pyrrolidone (50 mass part) as a solvent, to thereby obtain a slurry. The thus obtained slurry was applied to a copper (Cu) foil (serving as a negative electrode current collector and having a thickness of 20 µm), followed by pressing and drying, so as to finally prepare a negative electrode layer having a thickness of 20 µm. As such, a first negative electrode layer was prepared. In this case, the first negative electrode layer had a voidage of 35%. Then, the slurry like that set forth above was applied to the first negative electrode layer, followed by pressing (at a pressure lower than that for preparing the first negative electrode layer) and drying, so as to finally prepare a negative electrode layer having a thickness of 25 µm. As such, a second negative electrode layer was prepared. In this case, the second negative electrode layer had a voidage of 40%.

Except that the thus prepared positive electrode layer and negative electrode layer were used, operations like those of the example 1 were implemented, to thereby obtain a stack secondary battery.

The thus prepared stack secondary battery has such a structure that the electrolyte of each of the negative electrode layer and positive electrode layer is a liquid material while the electrolyte of the separator layer is a polymer. Moreover, in the stack secondary battery, each of the negative electrode layer and positive electrode layer uses a liquid electrolyte having a conductivity of $2\times10^{-3}$ (S/cm) while the separator layer uses a gel polymer electrolyte having a conductivity of $6\times10^{-4}$ (S/cm). As such, the gel polymer electrolyte having a conductivity lower than that of the liquid electrolyte interpenetrated (held) in the positive electrode layer or negative electrode layer is interpenetrated (held) in the separator layer.

According to the following methods, charging and discharging characteristic tests were implemented on the thus prepared secondary battery. Table 1 shows results of the tests.

Example 4

Except that the positive electrode layer and negative electrode layer used for the example 3 were used for the example 2, operations like those of the example 2 were implemented in the example 4, to thereby prepare a stack secondary battery.

The thus prepared stack secondary battery has such a structure that the electrolyte of the negative electrode layer is a liquid material while the electrolyte of each of the separator layer and the positive electrode layer is a polymer. Moreover, in the stack secondary battery, the negative electrode layer uses a liquid electrolyte having a conductivity of $2 \times 10^{-3}$ (S/cm) while each of the separator layer and the positive electrode layer uses a gel polymer electrolyte having a conductivity of $6 \times 10^{-4}$ (S/cm). As such, the gel polymer electrolyte having a conductivity lower than that of the liquid electrolyte interpenetrated (held) in the negative electrode layer is interpenetrated (held) in the separator layer and positive electrode layer.

According to the following methods, charging and discharging characteristic tests were implemented on the thus prepared secondary battery. Table 1 shows results of the tests.

Example 5

The example 1 was repeated except that the following 1) and 2) were implemented, to thereby prepare a stack secondary battery according to the example 5:

1) The positive electrode layer was prepared by using an aluminum (Al) foil (thickness: 20 μm) having a surface formed with grooves for interpenetrating electrolytic solution, where the grooves have intervals of 1 μm therebetween and have a volumetric ratio of 2.5% relative to a current collector, each of the grooves having a width of 1 μm and a depth of 1 μm.

2) Moreover, the negative electrode layer was prepared by using a copper (Cu) foil (thickness: 20 μm) having a surface formed with grooves for interpenetrating electrolytic solution, where the grooves have intervals of 1 μm therebetween and have a volumetric ratio of 2.5% relative to a current collector, each of the grooves having a width of 1 μm and a depth of 1 μm.

Moreover, according to the example 5, a stack structure of the positive electrode layer, separator layer and negative electrode layer was put in a laminate bag such that the grooves in each of the aluminum (Al) foil and the copper (Cu) foil are arranged in parallel to a direction of injecting the electrolytic solution.

The thus obtained stack secondary battery has such a structure that the electrolyte of each of the negative electrode layer and positive electrode layer is a liquid material while the electrolyte of the separator layer is a polymer. Moreover, in the stack secondary battery, each of the negative electrode layer and positive electrode layer uses a liquid electrolyte having a conductivity of $2 \times 10^{-3}$ (S/cm) while the separator layer uses a gel polymer electrolyte having a conductivity of $6 \times 10^{-4}$ (S/cm). As such, the gel polymer electrolyte having a conductivity lower than that of the liquid electrolyte interpenetrated (held) in the positive electrode layer or negative electrode layer is interpenetrated (held) in the separator layer.

According to the following methods, charging and discharging characteristic tests were implemented on the thus prepared secondary battery. Table 1 shows results of the tests.

Example 6

The example 2 was repeated except that the following 1) and 2) were implemented, to thereby prepare a stack secondary battery according to the example 6:

1) The positive electrode layer was prepared by using an aluminum (Al) foil (thickness: 20 μm) having a surface formed with grooves for interpenetrating electrolytic solution, where the grooves have intervals of 1 μm therebetween and have a volumetric ratio of 2.5% relative to a current collector, each of the grooves having a width of 1 μm and a depth of 1 μm.

2) Moreover, the negative electrode layer was prepared by using a copper (Cu) foil (thickness: 20 μm) having a surface formed with grooves for interpenetrating electrolytic solution, where the grooves have intervals of 1 μm therebetween and have a volumetric ratio of 2.5% relative to a current collector, each of the grooves having a width of 1 μm and a depth of 1 μm.

The thus obtained stack secondary battery has such a structure that the electrolyte of the negative electrode layer is a liquid material while the electrolyte of each of the separator layer and positive electrode layer is a polymer. Moreover, in the stack secondary battery, the negative electrode layer uses a liquid electrolyte having a conductivity of $2 \times 10^{-3}$ (S/cm) while each of the separator layer and positive electrode layer uses a gel polymer electrolyte having a conductivity of $6 \times 10^{-4}$ (S/cm). As such, the gel polymer electrolyte having a conductivity lower than that of the liquid electrolyte interpenetrated (held) in the negative electrode layer is interpenetrated (held) in the separator layer and positive electrode layer.

Charging and discharging characteristic tests were implemented on the thus prepared secondary battery according to the following methods. Table 1 shows results of the tests.

Example 7

Preparation of Positive Electrode Layer $LiMn_2O_4$ (average particle diameter: 10 μm) (90 mass part) as a positive electrode active material, carbon black (6 mass part) as a conductive assistant, and polyvinylidene fluoride (PVDF #1300) (4 mass part) as a binder were mixed. The thus prepared mixture as a positive electrode mixture was dispersed with N-methyl-2-pyrrolidone (50 mass part) as a solvent, to thereby obtain a slurry. The thus prepared slurry was applied (patterned) to an aluminum (Al) foil (serving as a current collector and having a thickness of 20 μm), so as to prepare grooves for interpenetrating electrolytic solution, which is a preparation of a first active material sublayer. In this case, the grooves have a volumetric ratio of 6.25% relative to a resultant positive electrode layer, each of the grooves having a width of 10 μm and a depth of 10 μm. Then, a second active material sublayer was applied (transcribed) to the thus patterned first active material sublayer for forming the grooves, followed by pressing and drying, so as to finally prepare the resultant positive electrode layer having a thickness of 80 μm. As such, the resultant positive electrode layer including the first and second active material sublayers and the current collector was prepared.

[Preparation of Negative Electrode Layer]

Artificial graphite powder (average particle diameter: 10 μm) (90 mass part) as a negative electrode active material and polyvinylidene fluoride (PVDF #9200) (10 mass part) as a binder were mixed were dispersed with N-methyl-2-pyrrolidone (50 mass part) as a solvent, to thereby obtain a slurry. The thus prepared slurry was applied (patterned) to a copper (Cu) foil (serving as a negative electrode current collector and having a thickness of 20 μm), so as to prepare grooves for interpenetrating electrolytic solution, which is a preparation of a first active material sublayer. In this case, the grooves have a volumetric ratio of 10% relative to a resultant negative electrode layer, each of the grooves having a width of 10 μm and a depth of 10 μm. Then, a second active material sublayer was applied (transcribed) to the thus patterned first active material sublayer for forming the grooves, followed by pressing and drying, so as to finally prepare the resultant negative electrode layer having a thickness of 50 μm. As such, the resultant negative electrode layer including the first and second active material sublayers and the current collector was prepared. Moreover, according to the example 7, a stack structure of the positive electrode layer, separator layer and negative electrode layer was put in a laminate bag such that the grooves in each of the positive electrode layer and negative electrode layer are arranged in parallel to a direction of injecting the electrolytic solution.

Except that the thus prepared positive electrode layer and negative electrode layer were used, the stack secondary battery according to the example 7 was prepared in a manner like that of the example 1.

The thus prepared stack secondary battery has such a structure that the electrolyte of each of the negative electrode layer and positive electrode layer is a liquid material while the electrolyte of the separator layer is a polymer. Moreover, in the stack secondary battery, each of the negative electrode layer and positive electrode layer uses a liquid electrolyte having a conductivity of $2 \times 10^{-3}$ (S/cm) while the separator layer uses a gel polymer electrolyte having a conductivity of $6 \times 10^{-4}$ (S/cm). As such, the gel polymer electrolyte having a conductivity lower than that of the liquid electrolyte interpenetrated (held) in the positive electrode layer or negative electrode layer is interpenetrated (held) in the separator layer.

Charging and discharging characteristic tests were implemented on the thus prepared secondary battery according to the following methods. Table 1 shows results of the tests.

Example 8

Except that the positive electrode layer and negative electrode layer prepared in the example 7 were used in the example 2, the stack secondary battery according to the example 8 was prepared in a manner like that of the example 2.

The thus prepared stack secondary battery has such a structure that the electrolyte of the negative electrode layer is a liquid material while the electrolyte of each of the separator layer and positive electrode layer is a polymer. Moreover, in the stack secondary battery, the negative electrode layer uses a liquid electrolyte having a conductivity of $2 \times 10^{-3}$ (S/cm) while each of the separator layer and positive electrode layer uses a gel polymer electrolyte having a conductivity of $6 \times 10^{-4}$ (S/cm). As such, the gel polymer electrolyte having a conductivity lower than that of the liquid electrolyte interpenetrated (held) in the negative electrode layer is interpenetrated (held) in the separator layer and positive electrode layer.

Charging and discharging characteristic tests were implemented on the thus prepared secondary battery according to the following methods. Table 1 shows results of the tests.

Comparative Example 1

According to the comparative example 1, the positive electrode layer and negative electrode layer were dipped in a vessel to be subjected to a vacuum impregnation at an ambient temperature for 1 hr, like the polyolefin film as the separator substrate in the example 1. Then, the negative electrode layer overlapped with the polyethylene film was sandwiched by parting films, then the thus obtained was lightly brandished with a roll for removing an excessive solid electrolytic precursor solution. The thus obtained was overlapped with a dried negative electrode layer, was put into a laminate bag and was sandwiched between glass plates on both sides for pressurizing, followed by a thermal polymerizing in an oven at 80° C. for 3 hr. In the above state, the separator layer has a contact with each of the positive electrode layer and negative electrode layer. Then, the secondary battery was prepared according to the comparative example 1, like according to the example 1. A gel polymer electrolyte having a conductivity of $6 \times 10^{-4}$ (S/cm) was used for the positive electrode layer, separator layer and negative electrode layer.

Charging and discharging characteristic tests were implemented on the thus prepared secondary battery according to the following methods. Table 1 shows results of the tests.

Comparative Example 2

The example 1 was repeated to thereby prepare the negative electrode layer. The thus prepared negative electrode layer was dipped in a vessel filled with the solid electrolytic precursor solution prepared in a manner like that of the example 1, followed by a vacuum impregnation at an ambient temperature for 1 hr. Then, the negative electrode layer was sandwiched by parting films then was lightly brandished with a roll for removing an excessive solid electrolytic precursor solution, to thereby obtain an impregnated negative electrode layer.

Except that the thus impregnated negative electrode layer was used as a negative electrode layer, the example 1 was repeated, i.e., the thermal polymerizing was implemented, to thereby obtain a stack structure of the positive electrode layer, separator layer and negative electrode layer. The above positive electrode layer is free of entry of electrolytic solution.

Then, the method of the example 1 was likewise repeated, to thereby prepare a stack secondary battery.

The thus prepared stack secondary battery has such a structure that the electrolyte of the positive electrode layer is a liquid material while the electrolyte of each of the separator layer and the negative electrode layer is a polymer. Moreover, in the stack secondary battery, the positive electrode layer uses a liquid electrolyte having a conductivity of $2 \times 10^{-3}$ (S/cm) while each of the separator layer and the negative electrode layer uses a gel polymer electrolyte having a conductivity of $6 \times 10^{-4}$ (S/cm).

Charging and discharging characteristic tests were implemented on the thus prepared secondary battery according to the following methods. Table 1 shows results of the tests.

Comparative Example 3

Except that the positive electrode layer and negative electrode layer used in the example 3 were used in the comparative example 2, the stack secondary battery according to the comparative example 3 was prepared in a manner like that of the comparative example 2.

The thus prepared stack secondary battery has such a structure that the electrolyte of the positive electrode layer is a liquid material while the electrolyte of each of the separator layer and the negative electrode layer is a polymer. Moreover, in the stack secondary battery, the positive electrode layer uses a liquid electrolyte having a conductivity of $2 \times 10^{-3}$ (S/cm) while each of the separator layer and the negative electrode layer uses a gel polymer electrolyte having a conductivity of $6 \times 10^{-4}$ (S/cm).

Charging and discharging characteristic tests were implemented on the thus prepared secondary battery according to the following methods. Table 1 shows results of the tests.

Comparative Example 4

Except that the positive electrode layer and negative electrode layer used in the example 5 were used in the comparative example 2, the stack secondary battery according to the comparative example 4 was prepared in a manner like that of the comparative example 2.

The thus prepared stack secondary battery has such a structure that the electrolyte of the positive electrode layer is a liquid material while the electrolyte of each of the separator layer and the negative electrode layer is a polymer. Moreover, in the stack secondary battery, the positive electrode layer uses a liquid electrolyte having a conductivity of $2\times10^{-3}$ (S/cm) while each of the separator layer and the negative electrode layer uses a gel polymer electrolyte having a conductivity of $6\times10^{-4}$ (S/cm).

Charging and discharging characteristic tests were implemented on the thus prepared secondary battery according to the following methods. Table 1 shows results of the tests.

Comparative Example 5

Except that the positive electrode layer and negative electrode layer prepared in the example 7 were used in the comparative example 2, the stack secondary battery according to the comparative example 5 was prepared in a manner like that of the comparative example 2.

The thus prepared stack secondary battery has such a structure that the electrolyte of the positive electrode layer is a liquid material while the electrolyte of each of the separator layer and the negative electrode layer is a polymer. Moreover, in the stack secondary battery, the positive electrode layer uses a liquid electrolyte having a conductivity of $2\times10^{-3}$ (S/cm) while each of the separator layer and the negative electrode layer uses a gel polymer electrolyte having a conductivity of $6\times10^{-4}$ (S/cm).

Charging and discharging characteristic tests were implemented on the thus prepared secondary battery according to the following methods. Table 1 shows results of the tests.

TABLE 1

|  | Discharging efficiency (%) | |
| --- | --- | --- |
|  | 0.2 C | 0.5 C |
| Example 1 | 90% | 85% |
| Example 2 | 81% | 56% |
| Example 3 | 95% | 91% |
| Example 4 | 85% | 68% |
| Example 5 | 95% | 90% |
| Example 6 | 84% | 63% |
| Example 7 | 95% | 92% |
| Example 8 | 83% | 65% |
| Comparative example 1 | 62% | 38% |
| Comparative example 2 | 65% | 41% |
| Comparative example 3 | 66% | 43% |
| Comparative example 4 | 67% | 41% |
| Comparative example 5 | 68% | 45% |

In view of the examples 1 and 2 compared with the comparative examples 1 and 2; the examples 3 and 4 compared with the comparative example 3; the examples 5 and 6 compared with the comparative example 4; and the examples 7 and 8 compared with the comparative example 5, it is found that the batteries of the present invention are more excellent in discharging efficiency have higher capacity and cause higher output.

Although the present invention has been described above by reference to certain embodiments and examples, the present invention is not limited to the embodiment and examples described above. Modifications and variations of the embodiments and examples described above will occur to those skilled in the art, in light of the above teachings.

This application is based on a prior Japanese Patent Application Nos. P2007-150802 (filed on Jun. 6, 2007 in Japan) and P2008-031801 (filed on Feb. 13, 2008 in Japan). The entire contents of the Japanese Patent Application Nos. P2007-150802 and P2008-031801 from which priorities are claimed are incorporated herein by reference, in order to take some protection against translation errors or omitted portions.

The scope of the present invention is defined with reference to the following claims.

What is claimed is:

1. A method of producing a secondary battery, the method comprising the following sequential operations:
    dipping a separator in a polymer electrolytic precursor solution to prepare an impregnated separator;
    adhering the impregnated separator to each of a positive electrode layer and a negative electrode layer by sandwiching the impregnated separator between the positive and negative electrode layers and polymerizing an electrolyte of the impregnated separator while applying a pressure to the positive electrode layer, the impregnated separator and the negative electrode layer in a direction of thickness of the positive electrode layer, the impregnated separator and the negative electrode layer, to thereby form a stack structure of the positive electrode layer, a separator layer and the negative electrode layer; and
    injecting a liquid electrolyte to the stack structure,
    wherein a conductivity of an electrolyte of the negative electrode layer in the secondary battery is higher than a conductivity of an electrolyte of at least one of the separator layer and the positive electrode layer.

2. The method of producing the secondary battery according to claim 1, wherein
    in the injection operation, a pressure is applied to a face of the stack structure from a direction substantially perpendicular to the face of the stack structure such that a thickness of the stack structure has a variation in a range within 5% of a certain thickness.

3. The method of producing the secondary battery according to claim 1, further comprising:
    at least one of the following first and second operations:
    a first operation of forming the positive electrode layer, including:
        forming a positive electrode current collector having a groove defining a width and a depth, and
        forming a positive electrode active material layer on the positive electrode current collector,
        wherein each of the width and the depth of the groove of the positive electrode current collector is less than or equal to 10% of an average particle diameter of the positive electrode active material layer, and
    a second operation of forming the negative electrode layer, including:
        forming a negative electrode current collector having a groove defining a width and a depth, and
        forming a negative electrode active material layer on the negative electrode current collector,
        wherein each of the width and the depth of the groove of the negative electrode current collector is less than or equal to 10% of an average particle diameter of the negative electrode active material layer.

4. A method of producing a secondary battery, the method comprising the following sequential operations:

dipping a separator in a polymer electrolytic precursor solution to prepare an impregnated separator;

adhering the impregnated separator to each of a positive electrode layer and a negative electrode layer by sandwiching the impregnated separator between the positive and negative electrode layers and polymerizing an electrolyte of the impregnated separator while applying a pressure to the positive electrode layer, the impregnated separator and the negative electrode layer in a direction of thickness of the positive electrode layer, the impregnated separator and the negative electrode layer, to thereby form a stack structure of the positive electrode layer, a separator layer and the negative electrode layer;

injecting a liquid electrolyte to the stack structure; and vacuum-impregnating the stack structure, wherein a conductivity of an electrolyte of the negative electrode layer in the secondary battery is higher than a conductivity of an electrolyte of at least one of the separator layer and the positive electrode layer.

5. The method of producing the secondary battery according to claim 4, wherein in the injecting operation, a pressure is applied to a face of the stack structure from a direction substantially perpendicular to the face of the stack structure, such that a thickness of the stack structure has a variation in a range within 5% of a certain thickness.

6. The method of producing the secondary battery according to claim 4, further comprising:

at least one of the following first and second operations:

a first operation of forming the positive electrode layer, including:

forming a positive electrode current collector having a groove defining a width and a depth, and forming a positive electrode active material layer on the positive electrode current collector, wherein each of the width and the depth of the groove of the positive electrode current collector, is less than or equal to 10% of an average particle diameter of the positive electrode active material layer, and a second operation of forming the negative electrode layer, including:

forming a negative electrode current collector, having a groove defining a width and a depth, and forming a negative electrode active material layer on the negative electrode current collector, wherein each of the width and the depth of the groove of the negative electrode current collector is less than or equal to 10% of an average particle diameter of the negative electrode active material layer.

* * * * *